(12) United States Patent
Huang et al.

(10) Patent No.: US 11,889,502 B2
(45) Date of Patent: Jan. 30, 2024

(54) TWO-STAGE FEEDBACK PROCEDURES

(71) Applicant: QUALCOMM Incorporated, San Diego, CA (US)

(72) Inventors: Yi Huang, San Diego, CA (US); Peter Gaal, San Diego, CA (US); Wanshi Chen, San Diego, CA (US); Jelena Damnjanovic, Del Mar, CA (US); Hwan Joon Kwon, San Diego, CA (US); Wei Yang, San Diego, CA (US); Sony Akkarakaran, Poway, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/181,803

(22) Filed: Feb. 22, 2021

(65) Prior Publication Data

US 2021/0266886 A1 Aug. 26, 2021

Related U.S. Application Data

(60) Provisional application No. 62/980,905, filed on Feb. 24, 2020.

(51) Int. Cl.
*H04L 5/00* (2006.01)
*H04W 72/20* (2023.01)
(Continued)

(52) U.S. Cl.
CPC ............ *H04W 72/20* (2023.01); *H04L 5/0055* (2013.01); *H04L 41/0677* (2013.01); *H04W 72/0453* (2013.01)

(58) Field of Classification Search
CPC .......... H04W 72/0406; H04W 72/0453; H04L 5/0055; H04L 41/0677; H04L 5/001;
(Continued)

(56) References Cited

U.S. PATENT DOCUMENTS 8,797,954 B2 * 8/2014 Buckley ................ H04L 5/0055
455/511
8,861,408 B2 * 10/2014 Damnjanovic ........ H04L 1/1854
455/501

(Continued)

FOREIGN PATENT DOCUMENTS

| CN | 104509020 A | * | 4/2015 | ......... H04L 25/0224 |
| CN | 103190112 B | * | 8/2016 | ........... H04L 1/1607 |

(Continued)

OTHER PUBLICATIONS

CATT: "UL Control Enhancements for URLLC", 3GPP Draft, 3GPP TSG RAN WG1 Meeting #96, R1-1902003, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051599698, 8 pages, Retrieved from the Internet: URL: http://www.3gpp.org/ftp/tsg%5Fran/WG1%5FRL1/TSGR1%5F96/Docs/R1%2D1902003%2Ezip [retrieved on Feb. 16, 2019] Secs 1, 2.2, Section 2.3.

(Continued)

*Primary Examiner* — Jay P Patel
(74) *Attorney, Agent, or Firm* — Holland & Hart LLP

(57) ABSTRACT

Methods, systems, and devices for wireless communications are described. Techniques are described for providing additional feedback about a channel as part of a feedback procedure. Feedback information associated with a feedback procedure may include two stages of feedback information. Each stage of feedback information may include a different type of information. A first stage may include acknowledge- (Continued)

ments or negative acknowledgements for each feedback process supported. A second stage may include additional feedback information related to any downlink transmission that was not received successfully and thus included a negative acknowledgement in the first stage. Additionally, or alternatively, the second stage may include additional feedback information related to any downlink transmission that was received successfully and thus included an acknowledgement in the first stage. Techniques are also described for handling the variable size of the feedback information included in the two stages.

31 Claims, 21 Drawing Sheets

(51) Int. Cl.
*H04L 41/0677* (2022.01)
*H04W 72/0453* (2023.01)

(58) Field of Classification Search
CPC ... H04L 1/1864; H04L 1/1854; H04L 1/1887; H04L 1/1896
See application file for complete search history.

(56) References Cited

U.S. PATENT DOCUMENTS

| | | | | |
|---|---|---|---|---|
| 9,009,573 | B2* | 4/2015 | Palanki | H04L 1/0065 714/774 |
| 10,912,063 | B2* | 2/2021 | Parkvall | H04W 72/20 |
| 10,966,236 | B2* | 3/2021 | Xiong | H04L 5/0094 |
| 11,503,627 | B2* | 11/2022 | Xiong | H04L 5/0078 |
| 2009/0221289 | A1* | 9/2009 | Xu | H04L 5/0053 455/435.1 |
| 2011/0280164 | A1* | 11/2011 | Luo | H04L 5/001 370/281 |
| 2012/0039291 | A1* | 2/2012 | Kwon | H04W 52/325 370/329 |
| 2012/0076077 | A1* | 3/2012 | Buckley | H04L 5/0055 370/328 |
| 2012/0082157 | A1* | 4/2012 | Yamada | H04L 1/0058 370/389 |
| 2012/0134305 | A1* | 5/2012 | Damnjanovic | H04L 1/1607 370/280 |
| 2012/0288025 | A1 | 11/2012 | Ogawa et al. | |
| 2012/0307760 | A1* | 12/2012 | Han | H04L 1/1896 370/329 |
| 2012/0320826 | A1* | 12/2012 | Kim | H04W 72/0446 370/328 |
| 2013/0022014 | A1* | 1/2013 | Hong | H04L 5/001 370/329 |
| 2013/0083748 | A1* | 4/2013 | Li | H04W 72/042 370/329 |
| 2014/0036704 | A1* | 2/2014 | Han | H04W 52/00 370/252 |
| 2014/0064159 | A1* | 3/2014 | Larsson | H04W 72/20 370/280 |
| 2017/0027002 | A1* | 1/2017 | Yerramalli | H04L 5/0053 |
| 2017/0041923 | A1* | 2/2017 | Park | H04L 5/0053 |
| 2017/0251461 | A1* | 8/2017 | Parkvall | H04W 72/20 |
| 2017/0325277 | A1* | 11/2017 | Fujishiro | H04W 28/04 |
| 2018/0054280 | A1* | 2/2018 | Fu | H04B 7/0621 |
| 2018/0062711 | A1* | 3/2018 | Mizusawa | H04W 72/042 |
| 2018/0124751 | A1* | 5/2018 | Aiba | H04W 28/04 |
| 2018/0160423 | A1* | 6/2018 | Yan | H04L 5/0057 |
| 2018/0206224 | A1* | 7/2018 | Hwang | H04L 5/0012 |
| 2018/0212718 | A1* | 7/2018 | Takeda | H04W 72/04 |
| 2018/0249458 | A1* | 8/2018 | He | H04L 5/0057 |
| 2018/0279213 | A1* | 9/2018 | Raghavan | H04B 7/0421 |
| 2018/0310298 | A1* | 10/2018 | Li | H04L 1/0031 |
| 2018/0352545 | A1* | 12/2018 | Takeda | H04L 1/1861 |
| 2019/0124688 | A1* | 4/2019 | Golitschek Edler von Elbwart | H04L 1/00 |
| 2019/0173622 | A1* | 6/2019 | Xiong | H04L 1/1819 |
| 2019/0208509 | A1* | 7/2019 | Takeda | H04L 1/1829 |
| 2019/0222361 | A1* | 7/2019 | Cheng | H04L 25/0226 |
| 2019/0245661 | A1* | 8/2019 | Baldemair | H04L 5/0055 |
| 2019/0261361 | A1* | 8/2019 | Xiong | H04W 72/02 |
| 2020/0022175 | A1* | 1/2020 | Xiong | H04L 5/001 |
| 2020/0068528 | A1* | 2/2020 | Abraham | H04L 1/1896 |
| 2020/0100284 | A1* | 3/2020 | Li | H04W 74/0808 |
| 2020/0120706 | A1* | 4/2020 | Sun | H04L 1/00 |
| 2020/0187236 | A1* | 6/2020 | Moon | H04L 5/0044 |
| 2020/0235892 | A1* | 7/2020 | Marinier | H04L 1/1671 |
| 2020/0404692 | A1* | 12/2020 | Yin | H04L 1/0031 |
| 2021/0036756 | A1* | 2/2021 | Wu | H04B 7/0456 |
| 2021/0067274 | A1* | 3/2021 | Takeda | H04L 1/1671 |
| 2021/0099896 | A1* | 4/2021 | Dimou | H04L 5/0055 |
| 2021/0105766 | A1* | 4/2021 | Wang | H04L 5/0055 |
| 2021/0152317 | A1* | 5/2021 | Li | H04L 5/0055 |
| 2021/0219328 | A1* | 7/2021 | Xiong | H04W 72/21 |
| 2021/0258102 | A1* | 8/2021 | Yang | H04L 1/1896 |
| 2021/0306089 | A1* | 9/2021 | Fehrenbach | H04L 1/0026 |
| 2022/0094479 | A1* | 3/2022 | Gao | H04L 5/0044 |
| 2022/0303100 | A1* | 9/2022 | Yang | H04L 1/1671 |
| 2022/0304027 | A1* | 9/2022 | Yang | H04W 72/121 |
| 2022/0345251 | A1* | 10/2022 | Lee | H04L 1/1887 |
| 2022/0386252 | A1* | 12/2022 | Lee | H04L 5/0094 |
| 2022/0400498 | A1* | 12/2022 | Lee | H04L 1/189 |
| 2023/0113127 | A1* | 4/2023 | Hosseini | H04L 1/0025 370/329 |

FOREIGN PATENT DOCUMENTS

| | | | | |
|---|---|---|---|---|
| CN | 107210898 A | * | 9/2017 | H04B 7/0452 |
| CN | 107431955 A | * | 12/2017 | H04J 11/00 |
| CN | 106850158 B | * | 4/2020 | H04L 1/1861 |
| EP | 2424149 A2 | * | 2/2012 | H04L 1/0026 |
| EP | 2636175 B1 | * | 1/2017 | H04L 1/1607 |
| EP | 3133888 A1 | * | 2/2017 | H04L 1/00 |
| EP | 3355494 A1 | | 8/2018 | |
| JP | 2013541924 A | * | 11/2013 | H04L 5/0005 |
| JP | 2018522449 A | * | 8/2018 | H04W 72/23 |
| WO | WO-2011085230 A2 | | 7/2011 | |
| WO | WO-2013169166 A1 | * | 11/2013 | H04L 1/1607 |

OTHER PUBLICATIONS

International Search Report and Written Opinion—PCT/US2021/019298—ISA/EPO—dated Jun. 8, 2021 (202386WO).
NTT Docomo, Inc: "UCI Multiplexing", 3GPP Draft, R1-1720819, 3GPP TSG RAN WG1 Meeting 91, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370248, pp. 1-5, Retrieved from the Internet: URL:http://www.3gpp.org/ftp/tsg%5Fran/WG1%5FRL1/TSGR1%5F91/Docs/ [retrieved on Nov. 18, 2017] Section 2.3.

* cited by examiner

TWO-STAGE FEEDBACK PROCEDURES

CROSS REFERENCE

The present Application for patent claims the benefit of U.S. Provisional Patent Application No. 62/980,905 by HUANG et al., entitled "TWO-STAGE FEEDBACK PROCEDURES," filed Feb. 24, 2020, assigned to the assignee hereof, and expressly incorporated by reference herein.

FIELD OF TECHNOLOGY

The following relates generally to wireless communications and more specifically to two-stage feedback procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support two-stage feedback procedures. Generally, the described techniques provide for providing additional feedback about a channel as part of a feedback procedure. Feedback information associated with a feedback procedure may include two stages of feedback information. Each stage of feedback information may include a different type of information. A first stage may include acknowledgements or negative acknowledgements for each feedback process supported. A second stage may include additional feedback information related to any downlink transmission that was not received successfully and thus included a negative acknowledgement in the first stage. The second stage of feedback information may include additional information about one or more channel characteristics or other information about the component carrier associated with that downlink signal that failed to be decoded. Additionally, or alternatively, the second stage may include additional feedback information related to any downlink transmission that was received successfully and thus included a positive acknowledgement in the first stage. Techniques are also described for handling the variable size of the feedback information included in the two stages.

A method for wireless communication at a UE is described. The method may include receiving one or more signals over one or more component carriers, determining that information associated with a first component carrier of the one or more component carriers failed to be successfully decoded, transmitting, using a first set of uplink resources, a first stage of feedback, the first stage including an acknowledgement or a negative acknowledgement associated with each component carrier of the one or more component carriers, and transmitting, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof.

An apparatus for wireless communication at a UE is described. The apparatus may include a processor, memory in electronic communication with the processor, and instructions stored in the memory. The instructions may be executable by the processor to cause the apparatus to receive one or more signals over one or more component carriers, determine that information associated with a first component carrier of the one or more component carriers failed to be successfully decoded, transmit, using a first set of uplink resources, a first stage of feedback, the first stage including an acknowledgement or a negative acknowledgement associated with each component carrier of the one or more component carriers, and transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof.

Another apparatus for wireless communication at a UE is described. The apparatus may include means for receiving one or more signals over one or more component carriers, means for determining that information associated with a first component carrier of the one or more component carriers failed to be successfully decoded, means for transmitting, using a first set of uplink resources, a first stage of feedback, the first stage including an acknowledgement or a negative acknowledgement associated with each component carrier of the one or more component carriers, and means for transmitting, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof.

A non-transitory computer-readable medium storing code for wireless communication at a UE is described. The code may include instructions executable by a processor to receive one or more signals over one or more component carriers, determine that information associated with a first component carrier of the one or more component carriers failed to be successfully decoded, transmit, using a first set of uplink resources, a first stage of feedback, the first stage including an acknowledgement or a negative acknowledgement associated with each component carrier of the one or more component carriers, and transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof.

In some examples of the method, apparatuses, and non-transitory computer-readable medium described herein, the first set of uplink resources may be part of a first physical uplink control channel resource and the second set of uplink resources may be part of a second physical uplink control channel resource different than the first physical uplink control channel resource.

Some examples of the method, apparatuses, and non-transitory computer-readable medium described herein may further include operations, features, means, or instructions for identifying the first set of uplink resources for the first stage of the feedback based on second information included in a first field of downlink control information, where transmitting the first stage may be based on identifying the first set of uplink resources, and identifying the second set of uplink resources for the second stage of the feedback based on third information included in a second field of the downlink control information different than the first field, where transmitting the second stage may be based on identifying the second set of uplink resources.

Some examples of the method, apparatuses, and non-transitory computer-readable medium described herein may further include operations, features, means, or instructions for identifying the first set of uplink resources for the first stage of the feedback, where transmitting the first stage may be based on identifying the first set of uplink resources, and identifying the second set of uplink resources for the second stage of the feedback based on a resource offset relative to the first set of uplink resources, where transmitting the second stage may be based on identifying the second set of uplink resources.

In some examples of the method, apparatuses, and non-transitory computer-readable medium described herein, the resource offset includes a constant slot resource, a constant offset in both a time resource and a frequency resource, a dynamic offset in both the time resource and the frequency resource configured by a radio resource control message, or a dynamic offset in both the time resource and the frequency resource configured by downlink control information, or a combination thereof.

Some examples of the method, apparatuses, and non-transitory computer-readable medium described herein may further include operations, features, means, or instructions for identifying a grant-free physical uplink channel resource, where the second set of uplink resources includes the grant-free physical uplink control channel resource, where transmitting the second stage may be based on identifying the grant-free physical uplink control channel resource.

In some examples of the method, apparatuses, and non-transitory computer-readable medium described herein, the first set of uplink resources and the second set of uplink resources may be part of a same physical uplink control channel resource.

In some examples of the method, apparatuses, and non-transitory computer-readable medium described herein, the first stage and the second stage may be separately encoded.

In some examples of the method, apparatuses, and non-transitory computer-readable medium described herein, the first set of uplink resources associated with the first stage include a first resource block and the second set of uplink resources associated with the second stage include a second resource block different than the first resource block.

In some examples of the method, apparatuses, and non-transitory computer-readable medium described herein, the first set of uplink resources associated with the first stage include a first resource element and the second set of uplink resources associated with the second stage include a second resource element different than the first resource element.

In some examples of the method, apparatuses, and non-transitory computer-readable medium described herein, the first stage and the second stage may be jointly encoded.

Some examples of the method, apparatuses, and non-transitory computer-readable medium described herein may further include operations, features, means, or instructions for determining that a size of information for the first stage and the second stage may be less than an upper limit of a size of the first set of uplink resources and the second set of uplink resources allocated for transmitting the first stage and the second stage, and appending one or more bits to the information for the first stage and the second stage based on determining that the size may be less than the upper limit, where transmitting the second stage may be based on appending the one or more bits to the information for the first stage and the second stage.

Some examples of the method, apparatuses, and non-transitory computer-readable medium described herein may further include operations, features, means, or instructions for determining that a size of information for the first stage and the second stage exceeds an upper limit of a size of the first set of uplink resources and the second set of uplink resources allocated for transmitting the first stage and the second stage, and compressing the additional feedback information of the second stage based on determining that the size exceeds the upper limit, where transmitting the second stage may be based on compressing the additional feedback information.

In some examples of the method, apparatuses, and non-transitory computer-readable medium described herein, the first set of uplink resources and the second set of uplink resources may be part of a same physical uplink control channel resource and a size of the second set of uplink resources for the second stage may be less than or equal to an upper limit.

Some examples of the method, apparatuses, and non-transitory computer-readable medium described herein may further include operations, features, means, or instructions for determining that a second size of the additional feedback information of the second stage exceeds the upper limit of the second set of uplink resources, and compressing the additional feedback information of the second stage based on determining that the second size exceeds the upper limit of the second set of uplink resources, where transmitting the second stage may be based on compressing the additional feedback information.

In some examples of the method, apparatuses, and non-transitory computer-readable medium described herein, the first stage and the second stage may be separately encoded.

In some examples of the method, apparatuses, and non-transitory computer-readable medium described herein, the first set of uplink resources associated with the first stage and the second set of uplink resources associated with the first stage may be partitioned in the physical uplink control channel resource on a resource block basis, a resource element basis, or a symbol basis.

In some examples of the method, apparatuses, and non-transitory computer-readable medium described herein, the first stage and the second stage may be jointly encoded.

Some examples of the method, apparatuses, and non-transitory computer-readable medium described herein may further include operations, features, means, or instructions for determining that a second size of the additional feedback information of the second stage is less than the upper limit of the second set of uplink resources, and appending one or more bits to the additional feedback information for the second stage based on determining that the second size is less than the upper limit, where transmitting the second stage may be based on appending the one or more bits to the additional feedback information for the second stage.

Some examples of the method, apparatuses, and non-transitory computer-readable medium described herein may further include operations, features, means, or instructions for selecting the same physical uplink control channel resource for transmitting the first stage and the second stage based on a second upper limit for a total size of the first stage and the second stage, where transmitting the second stage may be based on selecting the same physical uplink control channel resource.

Some examples of the method, apparatuses, and non-transitory computer-readable medium described herein may further include operations, features, means, or instructions for determining that downlink control information for the first component carrier failed to be detected, where the additional feedback information includes an indication that the downlink control information for the first component carrier failed to be detected.

In some examples of the method, apparatuses, and non-transitory computer-readable medium described herein, the downlink control information may be part of a physical downlink control channel of the first component carrier.

Some examples of the method, apparatuses, and non-transitory computer-readable medium described herein may further include operations, features, means, or instructions for determining that a physical downlink shared channel of the first component carrier failed to be successfully decoded, where the additional feedback information includes an indication of channel information associated with the physical downlink shared channel of the first component carrier that failed to be successfully decoded.

In some examples of the method, apparatuses, and non-transitory computer-readable medium described herein, the additional feedback information may include operations, features, means, or instructions for a first indicator that indicates whether downlink control information for the first component carrier failed to be detected, and a second indicator that indicates channel information about a physical downlink shared channel of the first component carrier.

In some examples of the method, apparatuses, and non-transitory computer-readable medium described herein, the channel information includes channel state information, channel quality information, precoder information, beam refinement information, or a combination thereof.

Some examples of the method, apparatuses, and non-transitory computer-readable medium described herein may further include operations, features, means, or instructions for receiving a downlink control message that indicates that the first component carrier of the one or more component carriers operates in a first mode for reporting the feedback and that a second component carrier of the one or more component carriers operates in a second mode for reporting the feedback different than the first mode, the first mode including transmitting the first stage of the feedback, and the second mode including transmitting the first stage of the feedback and the second stage of the feedback, where transmitting the second stage may be based on the second component carrier operating in the second mode.

Some examples of the method, apparatuses, and non-transitory computer-readable medium described herein may further include operations, features, means, or instructions for identifying the feedback for the first component carrier operating in the first mode using a first codebook, identifying the feedback for the second component carrier operating in the second mode using a second codebook different than the first codebook, and concatenating the feedback for the first component carrier and the feedback for the second component carrier, where transmitting the first stage or transmitting the second stage may be based on the concatenation.

In some examples of the method, apparatuses, and non-transitory computer-readable medium described herein, the feedback for the first component carrier operating in the first mode may be built using a first downlink assignment index and the feedback for the second component carrier operating in the second mode may be built using a second downlink assignment index different than the first downlink assignment index.

In some examples of the method, apparatuses, and non-transitory computer-readable medium described herein, the downlink control message may be a radio resource control message.

In some examples of the method, apparatuses, and non-transitory computer-readable medium described herein, the downlink control message indicates that a third component carrier of the one or more component carriers operates in a third mode different than the first mode and the second mode, the third mode including transmitting the first stage of the feedback for a first downlink channel of the third component carrier transmitting the first stage of the feedback and the second stage of the feedback for a second downlink channel of the third component carrier.

In some examples of the method, apparatuses, and non-transitory computer-readable medium described herein, the first downlink channel uses a first downlink control information format and the second downlink channel uses a second downlink control information format different than the first downlink control information format.

In some examples of the method, apparatuses, and non-transitory computer-readable medium described herein, an indicator in the downlink control information for the first downlink channel indicates whether feedback for the first downlink channel includes the second stage.

Some examples of the method, apparatuses, and non-transitory computer-readable medium described herein may further include operations, features, means, or instructions for identifying a first bit size of the first stage based on a first quantity of physical downlink shared channels scheduled on the one or more component carriers, and identifying a second bit size of the second stage based on a second quantity of negative acknowledgements included in the first stage, where transmitting the second stage may be based on identifying the second bit size of the second stage.

Some examples of the method, apparatuses, and non-transitory computer-readable medium described herein may further include operations, features, means, or instructions for identifying a bit width for the additional feedback information associated with the first component carrier, where identifying the second bit size may be based on identifying the bit width.

In some examples of the method, apparatuses, and non-transitory computer-readable medium described herein, the first stage of feedback and the second stage of feedback include stages of hybrid automatic repeat request feedback.

A method for wireless communication at a base station is described. The method may include transmitting one or more signals over one or more component carriers, receiving, using a first set of uplink resources, a first stage of feedback, the first stage including an acknowledgement or a negative acknowledgement associated with each component carrier of the one or more component carriers, receiving, using a second set of uplink resources different than the first set of uplink resources, a second stage of the feedback, the second stage including additional feedback information associated with a first component carrier associated with a first negative acknowledgement of the first stage, adjusting one or more parameters associated with the first component carrier based on the additional feedback information included in the second stage, and transmitting a first signal over the first component carrier based on adjusting the one or more parameters.

An apparatus for wireless communication at a base station is described. The apparatus may include a processor, memory in electronic communication with the processor, and instructions stored in the memory. The instructions may be executable by the processor to cause the apparatus to transmit one or more signals over one or more component carriers, receive, using a first set of uplink resources, a first stage of feedback, the first stage including an acknowledgement or a negative acknowledgement associated with each component carrier of the one or more component carriers, receive, using a second set of uplink resources different than the first set of uplink resources, a second stage of the feedback, the second stage including additional feedback information associated with a first component carrier associated with a first negative acknowledgement of the first stage, adjust one or more parameters associated with the first component carrier based on the additional feedback information included in the second stage, and transmit a first signal over the first component carrier based on adjusting the one or more parameters.

Another apparatus for wireless communication at a base station is described. The apparatus may include means for transmitting one or more signals over one or more component carriers, means for receiving, using a first set of uplink resources, a first stage of feedback, the first stage including an acknowledgement or a negative acknowledgement associated with each component carrier of the one or more component carriers, means for receiving, using a second set of uplink resources different than the first set of uplink resources, a second stage of the feedback, the second stage including additional feedback information associated with a first component carrier associated with a first negative acknowledgement of the first stage, means for adjusting one or more parameters associated with the first component carrier based on the additional feedback information included in the second stage, and means for transmitting a first signal over the first component carrier based on adjusting the one or more parameters.

A non-transitory central-readable medium storing code for wireless communication at a base station is described. The code may include instructions executable by a processor to transmit one or more signals over one or more component carriers, receive, using a first set of uplink resources, a first stage of feedback, the first stage including an acknowledgement or a negative acknowledgement associated with each component carrier of the one or more component carriers, receive, using a second set of uplink resources different than the first set of uplink resources, a second stage of the feedback, the second stage including additional feedback information associated with a first component carrier associated with a first negative acknowledgement of the first stage, adjust one or more parameters associated with the first component carrier based on the additional feedback information included in the second stage, and transmit a first signal over the first component carrier based on adjusting the one or more parameters.

In some examples of the method, apparatuses, and non-transitory computer-readable medium described herein, the first set of uplink resources may be part of a first physical uplink control channel resource and the second set of uplink resources may be part of a second physical uplink control channel resource different than the first physical uplink control channel resource.

Some examples of the method, apparatuses, and non-transitory computer-readable medium described herein may further include operations, features, means, or instructions for identifying the first set of uplink resources for the first stage of the feedback, identifying the second set of uplink resources for the second stage of the feedback, and transmitting downlink control information that includes a first field indicating the first set of uplink resources and a second field indicating the second set of uplink resources, the second field different that than the first field, where receiving the first stage and the second stage may be based on transmitting the downlink control information.

Some examples of the method, apparatuses, and non-transitory computer-readable medium described herein may further include operations, features, means, or instructions for transmitting downlink control information indicating a resource offset between the first set of uplink resources and the second set of uplink resources, where receiving the first stage and the second stage may be based on transmitting the downlink control information.

In some examples of the method, apparatuses, and non-transitory computer-readable medium described herein, the resource offset includes a constant slot resource, a constant offset in both a time resource and a frequency resource, a dynamic offset in both the time resource and the frequency resource configured by a radio resource control message, or a dynamic offset in both the time resource and the frequency resource configured by downlink control information, or a combination thereof.

In some examples of the method, apparatuses, and non-transitory computer-readable medium described herein, receiving the second set of uplink resources may include operations, features, means, or instructions for receiving a grant-free physical uplink channel resource that includes the second set of uplink resources.

In some examples of the method, apparatuses, and non-transitory computer-readable medium described herein, the first set of uplink resources and the second set of uplink resources may be part of a same physical uplink control channel resource.

In some examples of the method, apparatuses, and non-transitory computer-readable medium described herein, the first stage and the second stage may be separately encoded.

In some examples of the method, apparatuses, and non-transitory computer-readable medium described herein, the first set of uplink resources associated with the first stage include a first resource block and the second set of uplink resources associated with the second stage include a second resource block different than the first resource block.

In some examples of the method, apparatuses, and non-transitory computer-readable medium described herein, the first set of uplink resources associated with the first stage include a first resource element and the second set of uplink resources associated with the second stage include a second resource element different than the first resource element.

In some examples of the method, apparatuses, and non-transitory computer-readable medium described herein, the first stage and the second stage may be jointly encoded.

Some examples of the method, apparatuses, and non-transitory computer-readable medium described herein may further include operations, features, means, or instructions for determining that a size of information for the first stage and the second stage may be less than an upper limit of a size of the first set of uplink resources and the second set of uplink resources allocated for transmitting the first stage and the second stage, where receiving the second stage includes receiving the additional feedback information that may have been appended.

Some examples of the method, apparatuses, and non-transitory computer-readable medium described herein may further include operations, features, means, or instructions for determining that a size of information for the first stage and the second stage exceeds an upper limit of a size of the first set of uplink resources and the second set of uplink resources allocated for transmitting the first stage and the second stage, where receiving the second stage includes receiving the additional feedback information that may have been compressed.

In some examples of the method, apparatuses, and non-transitory computer-readable medium described herein, the first set of uplink resources and the second set of uplink resources may be part of a same physical uplink control channel resource and a size of the second set of uplink resources for the second stage may be less than or equal to an upper limit.

Some examples of the method, apparatuses, and non-transitory computer-readable medium described herein may further include operations, features, means, or instructions for determining that a second size of the additional feedback information of the second stage exceeds the upper limit of the second set of uplink resources, where receiving the second stage includes receiving the additional feedback information that may have been compressed.

In some examples of the method, apparatuses, and non-transitory computer-readable medium described herein, the first stage and the second stage may be separately encoded.

In some examples of the method, apparatuses, and non-transitory computer-readable medium described herein, the first set of uplink resources associated with the first stage and the second set of uplink resources associated with the first stage may be partitioned in the physical uplink control channel resource on a resource block basis, a resource element basis, or a symbol basis.

In some examples of the method, apparatuses, and non-transitory computer-readable medium described herein, the first stage and the second stage may be jointly encoded.

Some examples of the method, apparatuses, and non-transitory computer-readable medium described herein may further include operations, features, means, or instructions for determining that a second size of the additional feedback information of the second stage is less than the upper limit of the second set of uplink resources, where receiving the second stage includes receiving the additional feedback information that may have been appended.

In some examples of the method, apparatuses, and non-transitory computer-readable medium described herein, the same physical uplink control channel resource may be selected for transmitting the first stage and the second stage based on a second upper limit for a total size of the first stage and the second stage.

Some examples of the method, apparatuses, and non-transitory computer-readable medium described herein may further include operations, features, means, or instructions for identifying, in the additional feedback information of the second stage, an indication that downlink control information for the first component carrier failed to be detected, where adjusting the one or more parameters includes adjusting one or more transmission parameters of a physical downlink control channel associated with the first component carrier based on identifying the indication.

In some examples of the method, apparatuses, and non-transitory computer-readable medium described herein, the downlink control information may be part of a second physical downlink control channel of the first component carrier.

Some examples of the method, apparatuses, and non-transitory computer-readable medium described herein may further include operations, features, means, or instructions for identifying, in the additional feedback information of the second stage, an indication of channel information associated with a first physical downlink shared channel of the first component carrier that failed to be successfully decoded, where adjusting the one or more parameters includes adjusting one or more transmission parameters of a second physical downlink shared channel associated with the first component carrier based on identifying the indication.

In some examples of the method, apparatuses, and non-transitory computer-readable medium described herein, the additional feedback information may include operations, features, means, or instructions for a first indicator that indicates whether downlink control information for the first component carrier failed to be detected, and a second indicator that indicates channel information about a physical downlink shared channel of the first component carrier.

In some examples of the method, apparatuses, and non-transitory computer-readable medium described herein, the channel information includes channel state information, channel quality information, precoder information, beam refinement information, or a combination thereof.

Some examples of the method, apparatuses, and non-transitory computer-readable medium described herein may further include operations, features, means, or instructions for transmitting a downlink control message that indicates that the first component carrier of the one or more component carriers operates in a first mode for reporting the feedback and that a second component carrier of the one or more component carriers operates in a second mode for reporting the feedback different than the first mode, the first mode including transmitting the first stage of the feedback and the second mode including transmitting the first stage of the feedback and the second stage of the feedback, where receiving the second stage may be based on the second component carrier operating in the second mode.

In some examples of the method, apparatuses, and non-transitory computer-readable medium described herein, the feedback for the first component carrier operating in the first mode may be built using a first downlink assignment index and the feedback for the second component carrier operating in the second mode may be built using a second downlink assignment index different than the first downlink assignment index.

In some examples of the method, apparatuses, and non-transitory computer-readable medium described herein, the downlink control message may be a radio resource control message.

In some examples of the method, apparatuses, and non-transitory computer-readable medium described herein, the downlink control message indicates that a third component carrier of the one or more component carriers operates in a third mode different than the first mode and the second mode, the third mode including transmitting the first stage of the feedback for a first downlink channel of the third component carrier transmitting the first stage of the feedback and the second stage of the feedback for a second downlink channel of the third component carrier.

In some examples of the method, apparatuses, and non-transitory computer-readable medium described herein, the first downlink channel uses a first downlink control information format and the second downlink channel uses a second downlink control information format different than the first downlink control information format.

In some examples of the method, apparatuses, and non-transitory computer-readable medium described herein, an indicator in the downlink control information for the first downlink channel indicates whether feedback for the first downlink channel includes the second stage.

Some examples of the method, apparatuses, and non-transitory computer-readable medium described herein may further include operations, features, means, or instructions for identifying a first bit size of the first stage based on a first quantity of physical downlink shared channels scheduled on the one or more component carriers, and identifying a second bit size of the second stage based on a second quantity of negative acknowledgements included in the first stage, where receiving the second stage may be based on identifying the second bit size of the second stage.

Some examples of the method, apparatuses, and non-transitory computer-readable medium described herein may further include operations, features, means, or instructions for identifying a bit width for the feedback information associated with the first component carrier, where identifying the second bit size may be based on identifying the bit width.

In some examples of the method, apparatuses, and non-transitory computer-readable medium described herein, the first stage of feedback and the second stage of feedback include stages of hybrid automatic repeat request feedback.

DETAILED DESCRIPTION

A wireless communications system may support communications that are communicated according to low-latency parameters, high-reliability parameters, or both—for example, ultra-reliable low-latency communications (URLLC) or mission critical communications. In such examples, it may be desirable to reduce a quantity of retransmissions that occur as part of a hybrid automatic repeat request (HARQ) process to ensure latency or reliability parameters are satisfied. To that end, feedback information used in a HARQ process may be configured to include acknowledgements (ACKs)/negative acknowledgements (NACKs) and channel information used to adjust one or more parameters associated with the HARQ retransmission of the message.

Techniques are described for providing additional feedback about a channel as part of a HARQ feedback procedure. Feedback information associated with a HARQ procedure may include two stages of feedback information. Each stage of feedback information may include a different type of information. A first stage of feedback information may include ACKS or NACKs for each HARQ process supported. A second stage of the feedback information may include additional feedback information related to any downlink transmission that was not received successfully and thus included a NACK in the first stage. The second stage of feedback information may include additional information about one or more channel characteristics or other information about the component carrier associated with that downlink signal that failed to be decoded. Techniques are also described here for handling the variable size of the feedback information included in the two stages.

Aspects of the disclosure are initially described in the context of wireless communications systems. Aspects of the disclosure are described in the context of communication diagrams. Aspects of the disclosure are further illustrated by and described with reference to apparatus diagrams, system diagrams, and flowcharts that relate to two-stage feedback procedures.

Figure 1:
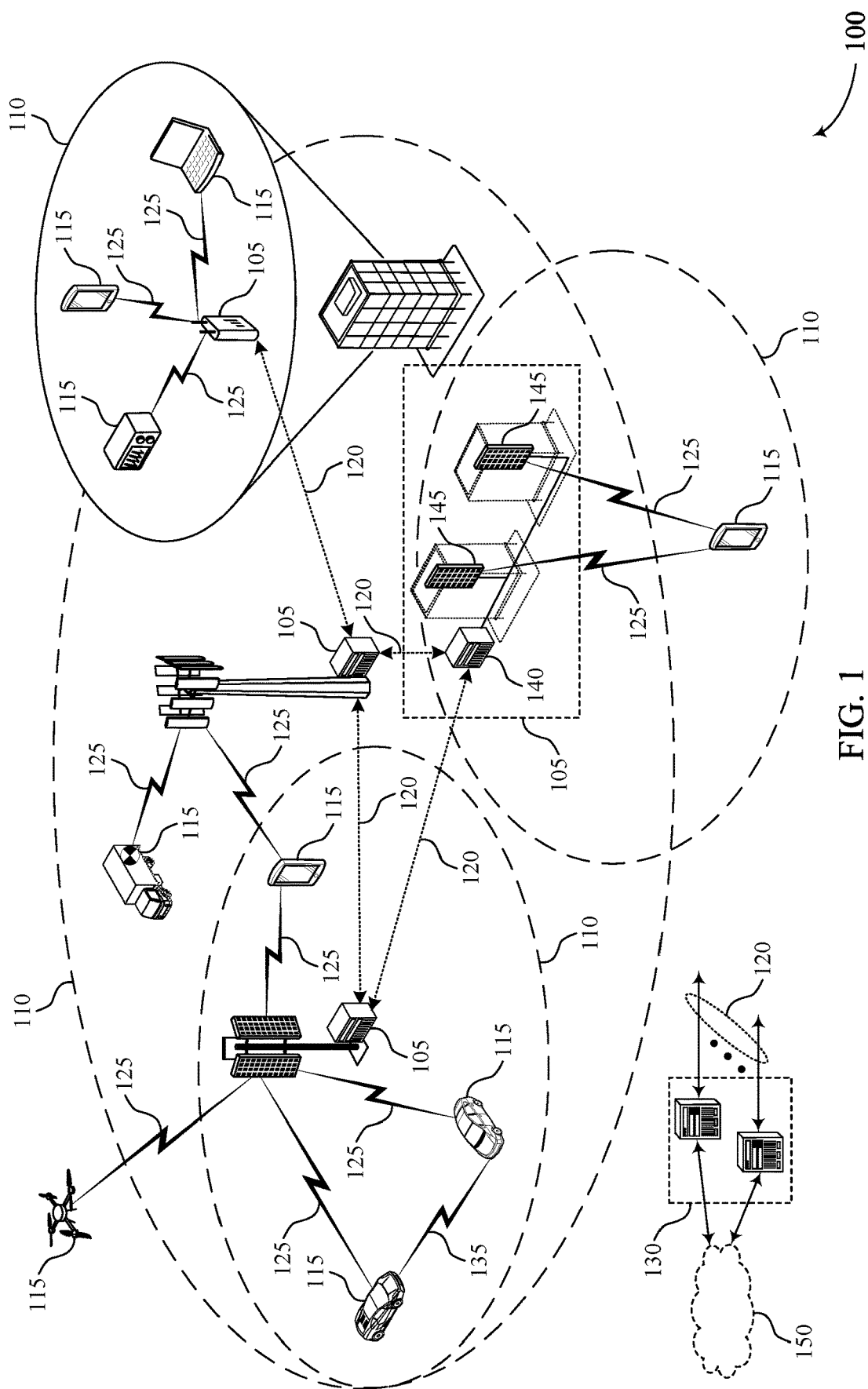
FIG. 1 illustrates an example of a wireless communication system that supports two-stage feedback procedures in accordance with aspects of the present disclosure.

FIG. 1 illustrates an example of a wireless communications system 100 that supports two-stage feedback procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Methods, systems, and devices for wireless communications are described. Techniques are described for providing additional feedback about a channel as part of a feedback procedure. Feedback information associated with a feedback procedure may include two stages of feedback information. Each stage of feedback information may include a different type of information. A first stage may include acknowledgements or negative acknowledgements for each feedback process supported. A second stage may include additional feedback information related to any downlink transmission that was not received successfully and thus included a negative acknowledgement in the first stage. The second stage of feedback information may include additional information about one or more channel characteristics or other information about the component carrier associated with that downlink signal that failed to be decoded. Techniques are also described for handling the variable size of the feedback information included in the two stages.

In some examples, a UE 115 may receive one or more signals over one or more component carriers (e.g., from a base station 105) and may determine that information associated with a first component carrier of the one or more component carriers failed to be successfully decoded. The UE 115 may transmit, using a first set of uplink resources, a first stage of feedback, where the first stage of feedback includes an ACK or a NACK associated with each component carrier of the one or more component carriers. The UE 115 may transmit, using a second set of uplink resources different than the first set of uplink resources, a second stage of the feedback, the second stage including additional feedback information associated with the first component carrier that failed to be successfully decoded.

Figure 2:
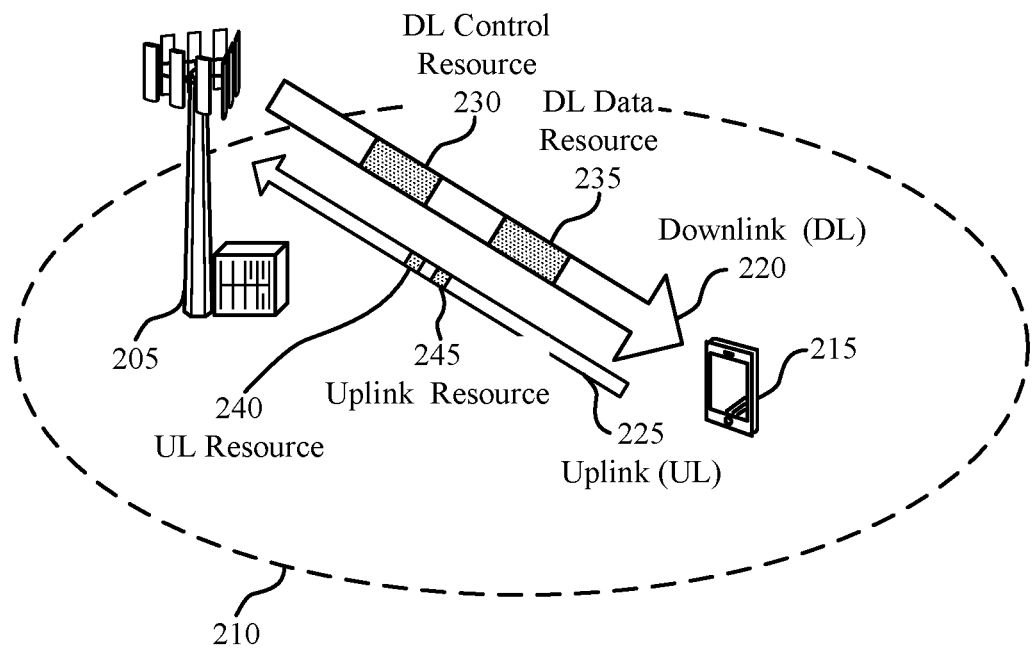
FIG. 2 illustrates an example of a wireless communication system that supports two-stage feedback procedures in accordance with aspects of the present disclosure.

FIG. 2 illustrates an example of a wireless communications system 200 that supports two-stage feedback procedures in accordance with aspects of the present disclosure. In some examples, the wireless communications system 200 may implement aspects of wireless communications system 100.

The wireless communications system 200 may include base station 205 and UE 215 which may be examples of a base station or UE described above with reference to FIG. 1. Base station 205 and UE 215 may communicate with one another within coverage area 210 using downlink 220 and uplink 225 and using techniques described above with reference to FIG. 1. The wireless communications system 200 may use enhanced modes for reporting HARQ feedback with channel information. Also, enhanced signaling techniques may be used to support the enhanced reporting modes.

The UE 215 receives a control message (e.g., a downlink control information (DCI) message) transmitted from base station 205 in downlink control resources (e.g., downlink control resource 230). The control message may indicate a location of (e.g., a set of time and frequency resources for) a transport block (or code block group) within downlink data resource 235. And UE 215 may decode the indicated transport block (or code block group) and may determine whether the transport block (or code block group) has been successfully decoded—e.g., based on a result of a cyclic redundancy check. UE 215 may then generate HARQ feedback based on a result of the decoding. For example, UE 215 may generate an ACK if the transport block (or code block group) is successfully decoded or may generate a NACK if the transport block (or code block group) is not successfully decoded. Some communications may have parameters indicating that the communications are low-latency, high-reliability, or both (e.g., URLLC). In such examples, it may be desirable to reduce a quantity of retransmissions that occur as part of the HARQ process to ensure latency or reliability parameters are satisfied. To that end, feedback information used in a HARQ process may be configured to include ACKs/NACKs and channel information used to adjust one or more parameters associated with the HARQ retransmission of the message.

A HARQ procedure may support any quantity of HARQ processes for providing HARQ feedback information for any quantity of component carriers (or transport blocks). For example, a single HARQ procedure may include feedback for one, two, three, four, five, or any quantity of HARQ processes. A HARQ process may refer to a process that includes a common HARQ identifier. For an individual HARQ process a dedicated ACK or NACK may be sent in response to a transmission or retransmission. A UE may aggregate the feedback for a plurality of HARQ identifiers into a common communication. A HARQ procedure may refer to process that includes the aggregated feedback for the different HARQ identifiers.

Techniques are described for providing additional feedback about a channel as part of a HARQ feedback procedure. Feedback information associated with a HARQ procedure may include two stages of feedback information. Each stage of feedback information may include a different type of information. In some cases, the terms stage and type may be used interchangeably. A first stage of feedback information may include ACKs or NACKs for each HARQ process or HARQ identifier supported by a HARQ procedure. A second stage of the feedback information may include additional feedback information related to any component carrier that was not received successfully and thus included a NACK in the first stage of the feedback information. The second stage of feedback information may include additional information about one or more channel characteristics or other information about the component carrier associated with that HARQ identifier that failed to be decoded. The channel information may include channel state information, channel quality information, precoder information, beam refinement information, or a combination thereof. Additionally, or alternatively, the second stage may include additional feedback information related to any component that was received successfully and thus included an ACK in the first stage.

In some examples, a base station 205 may transmit a downlink control resource 230 (e.g., a set of downlink control resources such as DCI or a physical downlink control channel (PDCCH)) to schedule a downlink data resource 235 (e.g., a set of downlink data resources such as physical downlink shared channel (PDSCH)). The UE 215 may fail to decode the downlink data resource 235 for a variety of reasons, including that the UE 215 did not detect or successfully decode the downlink control resource 230 or that the UE 215 did not detect or successfully decode the downlink data resource 235 after the downlink control resource 230 was detected or successfully decoded. In some cases, additional feedback information included in the second stage may include an indication of whether the downlink control resource 230 or the downlink data resource 235 failed to be detected or successfully decoded. The base station 205 may be configured to adjust different parameters based on whether the downlink control resource 230 or the downlink data resource 235 failed to be detected or successfully decoded. The UE 215 may transmit the first stage as part of an uplink resource 240 and may transmit the second stage as part of an uplink resource 245. In some cases, the uplink resource 240 and the uplink resource 245 may be conveyed using adjacent time resources, adjacent frequency resources, or both. In such cases, the uplink resource 240 and the uplink resource 245 may be considered the same uplink resource in some examples.

The UE 215 may be configurable with a plurality of feedback modes to provide different types of HARQ feedback to the base station 205 for different HARQ identifiers. Examples of different feedback modes may include a first feedback mode where the first stage of feedback information is communicated for a HARQ identifier, a second feedback mode where the first stage and the second stage of feedback information is communicated for a HARQ identifier, and a third feedback mode where a first portion of the communications associated with the HARQ identifier operate using the first feedback mode and a second portion of the communications associated with the HARQ identifier operate using the second feedback mode. A UE 215 may aggregate feedback information for different HARQ identifiers and different feedback modes as part of a single HARQ procedure and communicate that aggregated feedback information as a unit.

For example, while operating in the second feedback mode, the UE 215 may package (or bundle) the HARQ feedback generated for a transport block (or code block group or component carrier) with a recent channel information computed by the UE 215. The UE 215 may also determine that a single uplink resource is configured for the transmission of the bundled HARQ feedback and channel information and may identify a location of the uplink resource (e.g., first uplink resource 240) relative to a downlink data resource (e.g., downlink data resource 235)—e.g., based on the control message. After bundling the HARQ feedback and channel information and identifying the uplink resource, the UE 215 may transmit the bundled HARQ feedback and channel information to base station 205 using resources allocated to UE 215 in the identified uplink control resources.

After receiving the first stage of feedback information and the second stage of feedback information over one or more uplink resources, the base station 205 may adapt transmission parameters based on the indicated channel information. The base station 205 may also transmit subsequent communications (e.g., a transmission carrying new or redundant data) to the UE 215 using the adapted transmission parameters. By adapting the transmission parameters, the base station 205 may increase the likelihood of success for the subsequent transmission to the UE 215, increasing a reliability of the wireless communications system. Adapting the transmission parameters may also decrease the amount of performed retransmissions that occur before the UE 215 successfully receives downlink data, reducing latency for communications to the UE 215 and/or increasing throughput for the wireless communication system.

Using two stages of feedback information for HARQ processes may cause a total size of the HARQ feedback information provided by the UE 215 to the base station 205 to vary. Such variability in the size of the HARQ feedback information may cause challenges with decoding and signaling the size of the HARQ feedback information. Techniques are described herein for signaling the HARQ feedback information that includes the first stage and the second stage to account for the different amounts of information that may be included in the HARQ feedback. For example, if all of the component carriers are successfully decoded by the UE 215, the UE 215 may transmit the first stage of HARQ feedback information that includes ACKs and no information may be included in the second stage. In other examples, at least one component carrier associated with at least one HARQ identifier may fail to be successfully decoded and thus a NACK for that HARQ identifier may be communicated as part of the first stage and additional feedback information may be communicated as part of the second stage for that component carrier. In other examples, the total quantity of HARQ identifiers communicated as part of a HARQ procedure may vary (e.g., three HARQ identifiers or five HARQ identifiers). As the quantity of HARQ identifiers varies so does the size of the HARQ feedback information.

Figure 3:
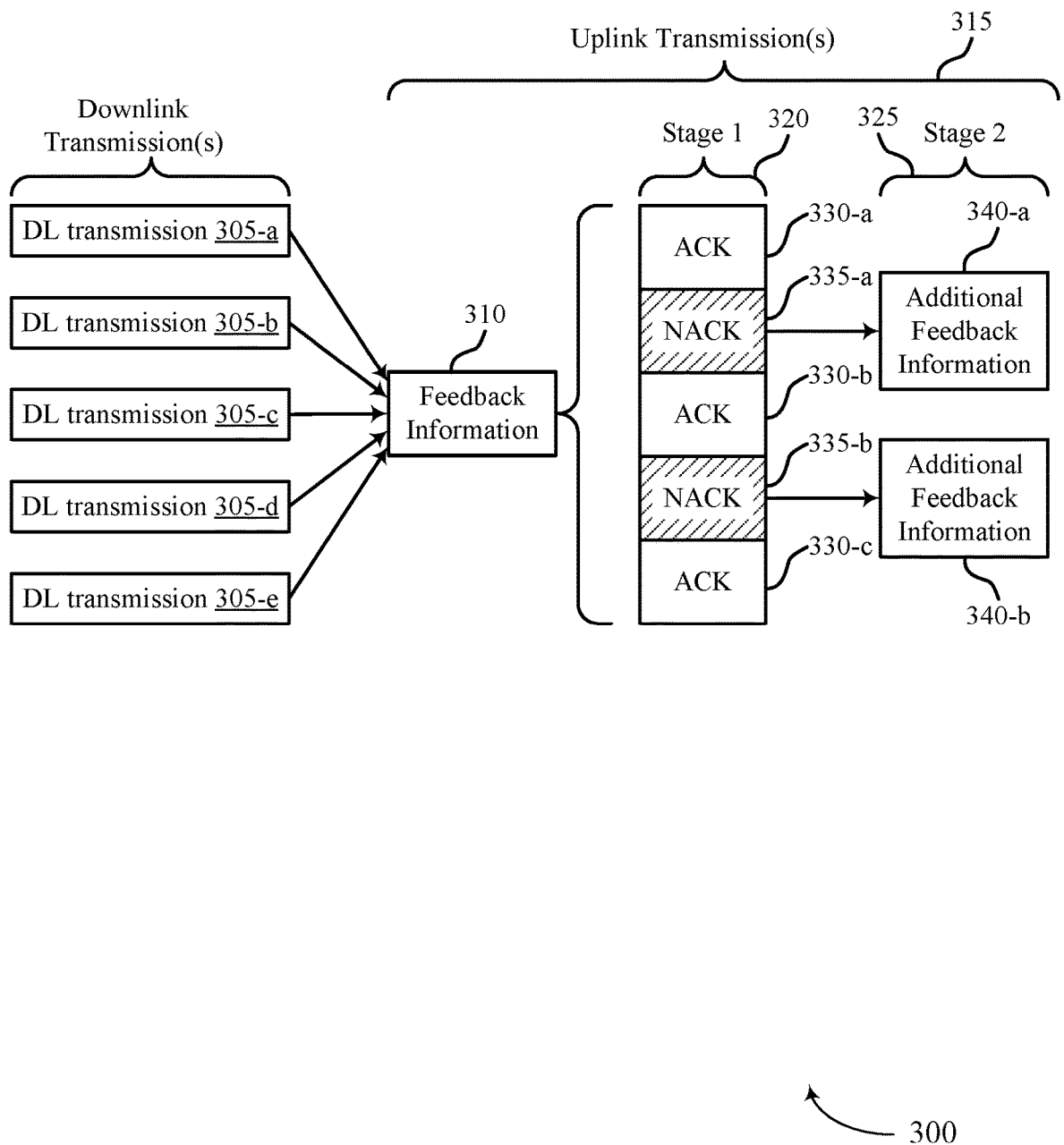
FIG. 3 illustrates an example of a communication diagram that supports two-stage feedback procedures in accordance with aspects of the present disclosure.

FIG. 3 illustrates an example of a communication diagram 300 that supports two-stage feedback procedures in accordance with aspects of the present disclosure. In some examples, the communication diagram 300 may implement aspects of wireless communications systems 100 or 200.

The communication diagram 300 illustrates various aspects of the two-stage procedure for providing HARQ feedback. By providing additional feedback information as part of the second stage of the feedback with the NACKs of the HARQ feedback, a base station may be enabled to use one or more different transmission parameters for the retransmission, such as a different modulation and coding scheme (MCS), a different resource allocation, a different transmission beam, or any combination thereof. The additional information may include a downlink control information miss detection (DTX) indicator, channel state information (CSI), channel quality information (CQI), precoder information, beam refinement information, or a combination thereof. In some cases, additional information may include a DTX indicator, CQI about the channel for which the communication failed, or a combination thereof.

The communication diagram 300 illustrates one or more downlink transmissions 305 communicated by a base station to a UE. The downlink transmissions 305 may include any quantity of transmissions (e.g., one, two, three, four, five, six, seven, eight, etc.). Each downlink transmission 305 may be associated with a HARQ process or a HARQ identifier such that an ACK or NACK is provided for each transmission as part of the first stage of the feedback information. A downlink transmission 305 may be an example of one or more signals communicated over one or more component carriers, one or more transport blocks, one or more code block groups, information communicated over a set of control resources (e.g., DCI or PDCCH), information communicated over a set of data resources (e.g., PDSCH), or a combination thereof.

After receiving one or more downlink transmissions 305, the UE may generate and provide feedback information 310 conveyed using one or more uplink transmissions 315. The feedback information 310 may include a first stage 320 of feedback information and a second stage 325 of feedback information. The first stage 320 of feedback information may include an ACK 330 or a NACK 335 for each downlink transmission 305 that is part of the HARQ procedure. The second stage 325 may include additional feedback information 340 associated with each downlink transmission 305 that is associated with a NACK 335. For example, if a UE receives five downlink transmissions (e.g., a first downlink transmission 305-a, a second downlink transmission 305-b, a third downlink transmission 305-c, a fourth downlink transmission 305-d, and a fifth downlink transmission 305-e) and the UE generates feedback information 310 (e.g., HARQ feedback information) for each downlink transmission. The UE may generate a first ACK 330-a for the first downlink transmission 305-a, a first NACK 335-a for the second downlink transmission 305-b, a second ACK 330-b for the third downlink transmission 305-c, a second NACK 335-b for the fourth downlink transmission 305-d, and a third ACK 330-c for the fifth downlink transmission 305-e. The UE may communicate the ACKs 330 and the NACKs 335 as part of the first stage 320 of feedback information. The UE may also generate additional feedback information 340 for each of the downlink transmissions 305 associated with a NACK 335-a (e.g., additional feedback information 340-a for the second downlink transmission 305-b and additional feedback information 340-b for the fourth downlink transmission 305-d). The UE may communicate the additional feedback information 340-a and 340-b as part of the second stage 325 of feedback information. In some examples, the UE may generate additional feedback information 340 for one or more downlink transmissions 305 associated with an ACK 330. For example, the UE may generate additional feedback information 340 (not shown) for one or more of the first downlink transmission 305-a, the third downlink transmission 305-c, and the fifth downlink transmission 305-e.

In some cases, the additional feedback information 340 may include either a DTX indicator or channel information (e.g., CQI) for a NACK 335 associated with a downlink transmission 305 (e.g., a transport block or code block group). In such cases, the additional feedback information 340 may be one or more bits. For example, the additional feedback information 340 may include the first indicator that indicates whether downlink control information for the downlink transmission failed to be detected (e.g., the DTX indicator) or the second indicator that indicates channel information about a physical downlink shared channel of the downlink transmission (e.g., CQI).

After receiving the downlink transmission 305, the UE may determine that the downlink control information for the downlink transmission 305 (e.g., component carrier) failed to be detected. In such cases, the additional feedback information 340 may include an indication that the downlink control information for the first component carrier failed to be detected (e.g., the DTX indicator). The downlink control information may be part of a physical downlink control channel of the downlink transmission 305 (e.g., component carrier). Upon receiving the additional feedback information 340, the base station may identify the indication that downlink control information for the first component carrier failed to be detected and the base station may adjust one or more transmission parameters of a physical downlink control channel associated with the downlink transmission 305 based on identifying the indication. Examples of transmission parameters that the base station may adjust for the PDCCH may include transmission beam, a transmission configuration indication (TCI) indicator, a transmission power, or a combination thereof. In cases were the PDCCH failed to be detected, the base station may treat the retransmission of the PDSCH as if it is an initial transmission by setting the redundancy version index (RVID) to zero (0) and toggling the new data indicator (NDI) to indicate it is a new transport block.

After receiving the downlink transmission 305, the UE may determine that a physical downlink shared channel of the first component carrier failed to be successfully decoded. In such examples, the additional feedback information 340 may include an indication of channel information associated with the physical downlink shared channel of the first component carrier that failed to be successfully decoded. Upon receiving the additional feedback information 340, the base station may identify the indication of channel information associated with a first physical downlink shared channel of the first downlink transmission 305 that failed to be successfully decoded and the base station may adjust one or more transmission parameters of a physical downlink shared channel associated with the downlink transmission 305 based on identifying the indication. Examples of transmission parameters that the base station may adjust for the PDSCH may include a transmission beam, a quasi-colocation (CQL) indicator, a transmission power, or a combination thereof. In cases were the PDSCH failed to be decoded, the base station may set the RVID to a non-zero (e.g., RVID=2) and may toggle the NDI to indicate the PDSCH is not a new transport block.

In some cases, the additional feedback information 340 may include a DTX indicator and channel information (e.g., CQI) for a NACK 335 associated with a downlink transmission 305 (e.g., a transport block or code block group). The additional feedback information 340 may be two or more bits. In some examples, a first portion of the additional feedback information 340 (e.g., one or more bits) may be an example of a first indicator that indicates whether downlink control information for the downlink transmission 305 failed to be detected (e.g., the DTX indicator). In some examples, a second portion of the additional feedback information 340 (e.g., one or more bits) may be an example of a second indicator that indicates channel information about a physical downlink shared channel of the downlink transmission (e.g., CQI). In some cases, the channel information includes channel state information, channel quality information, precoder information, beam refinement information, or a combination thereof. In some examples, the two or more indicators included in the additional feedback information 340 may be separately encoded such that one or more bits are dedicated to one indicator and one or more other bits are dedicated to another indicator. In some examples, the two or more indicators may be jointly encoded. Table 1, provided below, illustrates a joint encoding scheme for the additional feedback information 340.

TABLE 1

| Bit value | Information conveyed by bit value |
|---|---|
| 00 | DTX Indicator. The UE may fail to detect the DCI scheduling the PDSCH of the downlink transmission. In this case, the channel information associated with the PDSCH is not included because UE may not be able to identify the PDSCH after failing to detect the DCI. |
| 01 | CQI update/refinement. The UE may determine that the PDSCH failed to be decoded with a marginal logarithm of likelihood ratio (LLR). This bit value may indicate that a retransmission may pass with a same MCS (e.g., X = 0). |
| 10 | CQI update/refinement. The UE may determine that the PDSCH failed to be decoded with a medium-to-low LLR. This bit value may indicate that a retransmission may pass with a lower MCS (e.g., X = 2). |
| 11 | CQI update/refinement. The UE may determine that the PDSCH failed to be decoded with a low LLR. This bit value may indicate that a retransmission may pass with a significantly lower MCS (e.g., X = 4). |

Table 1 illustrates an example of an encoding scheme. Other encoding schemes are within the scope of this disclosure. The base station functionality and the UE functionality for handling the additional feedback information may be applied with any combination of indicators included in the additional feedback information 340.

The base station and/or the UE may determine a total size of the feedback information 310, a size of the first stage 320, a size of the second stage 325 or any combination thereof. For example, the base station or the UE may identify a first size (e.g., a bit size or a quantity of bits) of the first stage 320 based on a first quantity of physical downlink shared channels scheduled on the one or more downlink transmissions 305. The base station or the UE may also identify a second size (e.g., a bit size or a quantity of bits) of the second stage 325 based on a second quantity of NACKs included in the first stage 320. The base station or the UE may identify the size of the first stage 320 based on a quantity of ACKs/NACKs to be included in the HARQ procedure. The base station or the UE may identify a bit width for the additional feedback information 340 associated with a given downlink transmission 305.

In some examples, a size of the first stage 320 may be based on a codebook size. In some instances, the first stage 320 may utilize a HARQ-ACK codebook as defined in a technical specification or standard. In some cases, the codebook may be a type one (semi-static codebook), and the size of the first stage 320 may be configured by one or more downlink control messages. The downlink control message may be an example of a radio resource control (RRC) message or RRC signaling. The downlink control message may include an indicator in the downlink control information for the first downlink channel indicates whether feedback for the first downlink channel includes the second stage. In some cases, the codebook is type two (dynamic codebook), and the size of the first stage 320 may be indicated by a downlink assignment index (DAI) field in the DL DCI.

When determining a size of the second stage 325, the base station and/or UE may determine the size as N*M, where N is the number of NACKs in first stage 320 and M is an RRC configurable bit width for the additional feedback information 340 associated with NACK. In some examples, M may equal one bit or may equal two bits, as in the jointly encoded example described with reference to Table 1. The size of the second stage 325 may depend on the payload in the first stage 320. The base station may decode the information in the first stage 320 before it can determine a size of the second stage 325. Similarly, the UE may generate the information for the first stage 320 before it can determine a size or content of the second stage 325. For example, the size of the first stage 320 may depend on how many PDSCHs are scheduled on the component carriers associated with the HARQ procedure, and the size may range from zero (0) to five (5) bits. If the bit width of the second stage 325 is two bits, the size of the second stage 325 may range between zero (0) and ten (10) bits depending the quantity of NACKs in the first stage 320. The total size of the feedback information 310 may range between zero (0) and fifteen (15) bits in this example. Techniques are described for handling the variable size of the feedback information 310.

Variability in the size of the feedback information 310 may cause some challenges for signaling the feedback information 310 from the UE to the base station. A variety of techniques may be employed to allow the size of the feedback information 310 to be variable, to signal that variability between the base station and the UE, and to limit that variability (when applicable). Example of such techniques may include using separate physical uplink control channel (PUCCH) resources for the first stage 320 and the second stage 325, using a single PUCCH resource for both the first stage 320 and the second stage 325 and an upper bound for the total size of the feedback information 310, and/or using a signal PUCCH resource with an upper limit for the size of the second stage 325.

In a first option for handling size variability, separate PUCCH resources may be used to communicate the first stage 320 and the second stage 325. For example, the first stage 320 may be communicated using a first PUCCH resource (e.g., a first set of uplink resources) and the second stage 325 may be communicated using a second PUCCH resource (e.g., a second set of uplink resources) different than the first PUCCH resource.

When using two separate PUCCH resources there may be a variety of ways to signal which resources to be used. The base station may identify the first PUCCH resource used for the first stage 320 and may communicate the first PUCCH resource using a variety of means. In some cases, the first PUCCH resources may be determined using standard HARQ processing techniques, such as synchronous HARQ or asynchronous HARQ. The base station may identify the second PUCCH resource used for the second stage 325 and may communicate that as well. The second PUCCH resource may be determined based on DCI signaling, a resource offset, or may be configured to use a grant-free PUCCH resource.

In some examples, the downlink control information may include a field dedicated to indicating whether the second stage 325 is present or the second PUCCH resources used for the second stage. The base station may transmit the DCI with such a field and the UE may identify the second PUCCH resource to use for the second stage 325.

In some examples, the second PUCCH resources used for the second stage 325 may be derived based on the first PUCCH resources used for the first stage 320. In some examples, a resource offset may be used to determine the second PUCCH resources relative to the first PUCCH resources. Examples of the resource offset may include a constant slot resource, a constant offset in both a time resource and a frequency resource, a dynamic offset in both the time resource and the frequency resource configured by a radio resource control message, or a dynamic offset in both the time resource and the frequency resource configured by downlink control information, or a combination thereof. The resource offset may be communicate using control signaling (e.g., DCI or RRC signaling). The resource offset may be stored in the base station and UE and known beforehand. The base station and the UE may identify the first PUCCH resource and then may use the resource offset to identify the second PUCCH resource.

In some examples, the second PUCCH resource may be communicated using a grant-free PUCCH resource or a grant-free physical uplink shared channel (PUSCH) resource. Such a grant-free PUCCH resource may be RRC configured and may be an example of a semi-static resource. The UE may identify the grant-free physical uplink channel resource for use as the second PUCCH resource for the second stage 325. The base station may receive the grant-free physical uplink channel resource and identify the additional feedback information 340 included in the resource. In some cases, the UE may determine whether the first PUCCH and the second PUCCH overlap in the time domain, and the UE may determine to use the resource offset example or the grant-free physical uplink channel to determine the second PUCCH based on that determination.

In a second option for handling size variability, a single PUCCH resource for both the first stage 320 and the second stage 325 and an upper bound for the total size of the feedback information 310 may be used. For example, the first stage 320 and the second stage 325 may be communicated using a single PUCCH resource that may include the first set of uplink resources and the second set of uplink resources. In this option, the first stage 320 may be fully communicated and information of the second stage 325 may be compressed if the size of the feedback information 310 exceeds the upper limit.

The base station or the UE may identify an upper limit for a total size of the feedback information 310. The upper limit may be communicated using control signaling (e.g., DCI or RRC signaling). The upper limit may be stored in the base station and UE and known beforehand. The first stage 320 and the second stage 325 may be jointly encoded or may be separately encoded. In some examples, when the base station or the UE select resources (e.g., resource blocks) to transmit the feedback information 310 in the PUCCH resource, the base station or UE may use the upper limit rather than the actual size of the feedback information. For example, if the upper limit is seven (7) bits and the actual size of the feedback information 310 is five (5) bits, the base station or UE may use the seven (7) bit value to determine the resources to use for the feedback information 310.

In some cases, if the size of the feedback information 310 exceeds or satisfies the upper limit, the additional feedback information 340 of the second stage 325 may be compressed by the UE. In some cases, if the size of the feedback information 310 does not exceed or satisfy the upper limit, one or more bits may be appended to the feedback information 310 (e.g., appended to the second stage 325) to bring the feedback information 310 to the upper limit size. To make these determinations, the base station or the UE may identify the total size of the feedback information 310 and compare that to the upper limit.

In examples where the first stage 320 and the second stage 325 are separately encoded, the resource partition between first stage 320 and the second stage 325 may be determined at a resource block level, a resource element level, or a symbol level (e.g., an OFDM symbol level). For example, the first set of uplink resources associated with the first stage 320 may include a first resource block and the second set of uplink resources associated with the second stage 325 may include a second resource block different than the first resource block. In other examples, the first set of uplink resources associated with the first stage 320 may include a first resource element and the second set of uplink resources associated with the second stage 325 may include a second resource element different than the first resource element. In other examples, the first set of uplink resources associated with the first stage 320 may include a first symbol and the second set of uplink resources associated with the second stage 325 may include a second symbol different than the first symbol.

In examples where the first stage 320 and the second stage 325 are jointly encoded, dummy bits may be added to the feedback information if the total size of the feedback information 310 does not meet or exceed the upper limit. In the separately encoded example, dummy bits may or may not be appended.

In a third option for handling size variability, a signal PUCCH resource with an upper limit for the size of the second stage 325 may be used. For example, the first stage 320 and the second stage 325 may be communicated using a single PUCCH resource that may include the first set of uplink resources and the second set of uplink resources. In this option, the first stage 320 may be fully communicated and information of the second stage 325 may be compressed if the size of the second stage 325 exceeds the upper limit.

The base station or the UE may identify an upper limit for a size of the additional feedback information 340 of the second stage 325. The upper limit may be communicated using control signaling (e.g., DCI or RRC signaling). The upper limit may be stored in the base station and UE and known beforehand. The first stage 320 and the second stage 325 may be jointly encoded or may be separately encoded. In some examples, when the base station or the UE select resources (e.g., resource blocks) to transmit the feedback information 310 in the PUCCH resource, the base station or UE may use the upper limit rather than the actual size of the additional feedback information 340 of the second stage 325. For example, if the upper limit of the second stage 325 is four (4) bits and the actual size of the additional feedback information 340 of the second stage 325 is two (2) bits, the base station or UE may use the four (4) bit value to determine the resources to use for the feedback information 310.

In some cases, if the size of the additional feedback information 340 of the second stage 325 exceeds or satisfies the upper limit, the additional feedback information 340 of the second stage 325 may be compressed by the UE. In some cases, if the size of the additional feedback information 340 of the second stage 325 does not exceed or satisfy the upper limit, one or more bits may be appended to the additional feedback information 340 to bring the additional feedback information 340 to the upper limit size. To make these determinations, the base station or the UE may identify the size of the additional feedback information 340 of the second stage 325 and compare that to the upper limit.

In examples where the first stage 320 and the second stage 325 are separately encoded, the resource partition between first stage 320 and the second stage 325 may be determined at a resource block level, a resource element level, or a symbol level (e.g., an OFDM symbol level). For example, the first set of uplink resources associated with the first stage 320 may include a first resource block and the second set of uplink resources associated with the second stage 325 may include a second resource block different than the first resource block. In other examples, the first set of uplink resources associated with the first stage 320 may include a first resource element and the second set of uplink resources associated with the second stage 325 may include a second resource element different than the first resource element. In other examples, the first set of uplink resources associated with the first stage 320 may include a first symbol and the second set of uplink resources associated with the second stage 325 may include a second symbol different than the first symbol.

In examples where the first stage 320 and the second stage 325 are jointly encoded, dummy bits may be added to the additional feedback information 340 if the total size of the additional feedback information 340 does not meet or exceed the upper limit. In the separately encoded example, dummy bits may or may not be appended.

A specific example of the for the third option for handling variability is described. In an example where the first stage 320 may include up to five bits of ACK/NACK information and the bit width of the second stage 325 is two bits, the total size of the second stage 325 may be up to ten (10) bits and the total size of the feedback information 310 may be up to fifteen (15) bits. Using the third option, the upper limit for the second stage 325 may be set at four (4) bits. With such limitations, the total size of the feedback information 310 may be determined by adding the size of the first stage 320 (e.g., a bit value between 0 and five) and the size of the second stage 325 (e.g., a bit value between 0 and four). Suppose that the PUCCH resource selected for communicating the has nine (9) resource blocks and the first stage 320 is five bits and the second stage 325 is two bits. Based on the coding rate of the PUCCH resource five (5) resource blocks may be assigned to the first stage 320, leaving four (4) resource blocks for the second stage 325, which is more than enough to communicate the two bit payload of the second stage 325, because according to the coding rate of PUCCH, two resource blocks may be sufficient to transmit two bits of the second stage. In such cases, a UE may use remaining four (4) resource blocks to transmit the two bits of the second stage, with a lower PUCCH coding rate (in some cases).

In the example described above, it may be useful to use the upper limit of the second stage 325 to determine the resource selection rather than the actual size of the additional feedback information 340 in the second stage 325. The reasoning described below also applies to the second option which uses an upper limit of the total size of the feedback information 310 to select the resources used for the transmission. The size of the additional feedback information 340 of the second stage 325 (e.g., two bits) is unknown to the base station, if UE uses two resource blocks for the transmission of the second stage 325. The base station may not know how many resource blocks the UE uses in total for transmitting the first stage 320 and the second stage 325. For PUCCH format 2, which is in OFDM waveform, such conditions may be alright because the base station may know that the first stage 320 uses five resource blocks and the base station can decode the first stage 320 by extracting the five resource blocks from the received signals post fast Fourier transform (FFT). For PUCCH format 3, which is in DFT-S-OFDM waveform, the base station may not know exactly how many resource blocks are used for transmitting the first stage 320 and the second stage 325, and the base station may not be able to perform discrete Fourier transform (DFT) operation correctly (with correct DFT size) to decode the first stage 320, even in the situation when the base station knows the quantity of resource blocks used for the first stage 320.

Based on the above reasoning, in both the second option for using an upper limit for the total size of the feedback information 310 and the third option for using an upper limit for the size of the second stage 325, the determination of the quantity of resource blocks used to transmit the first stage 320 and the second stage 325 in the selected PUCCH resource is based on a reference payload size, which may be set based on the respective upper limits. For example, for the second option, the reference payload size may be the upper limit of the total size of the feedback information 310. In another example, for the third option the reference payload size may be the size of the first stage plus the upper limit for the size of the second stage 325. In the specific example described above, if UE transmits nine resource blocks based on the upper limit for the second stage 325 being four (4) bits, the base station may know that the UE transmitted with nine (9) resource blocks. The base station may also know that the UE performed a nine (9) resource block DFT. Hence, the base station may extract nine (9) resource blocks from post-FFT signals and perform DFT based on nine (9) resource blocks. In such examples, if joint encoding is used for the first stage 320 and the second stage 325, dummy bits may be appended to make the total size fit the upper limit. If separate encoding is used for the first stage 320 and the second stage 325, dummy bits may not be used, in some cases. In such cases, the payload of the second stage 325 may be encoded with lower code rate, which may fill up the remaining resource blocks.

Figure 4:
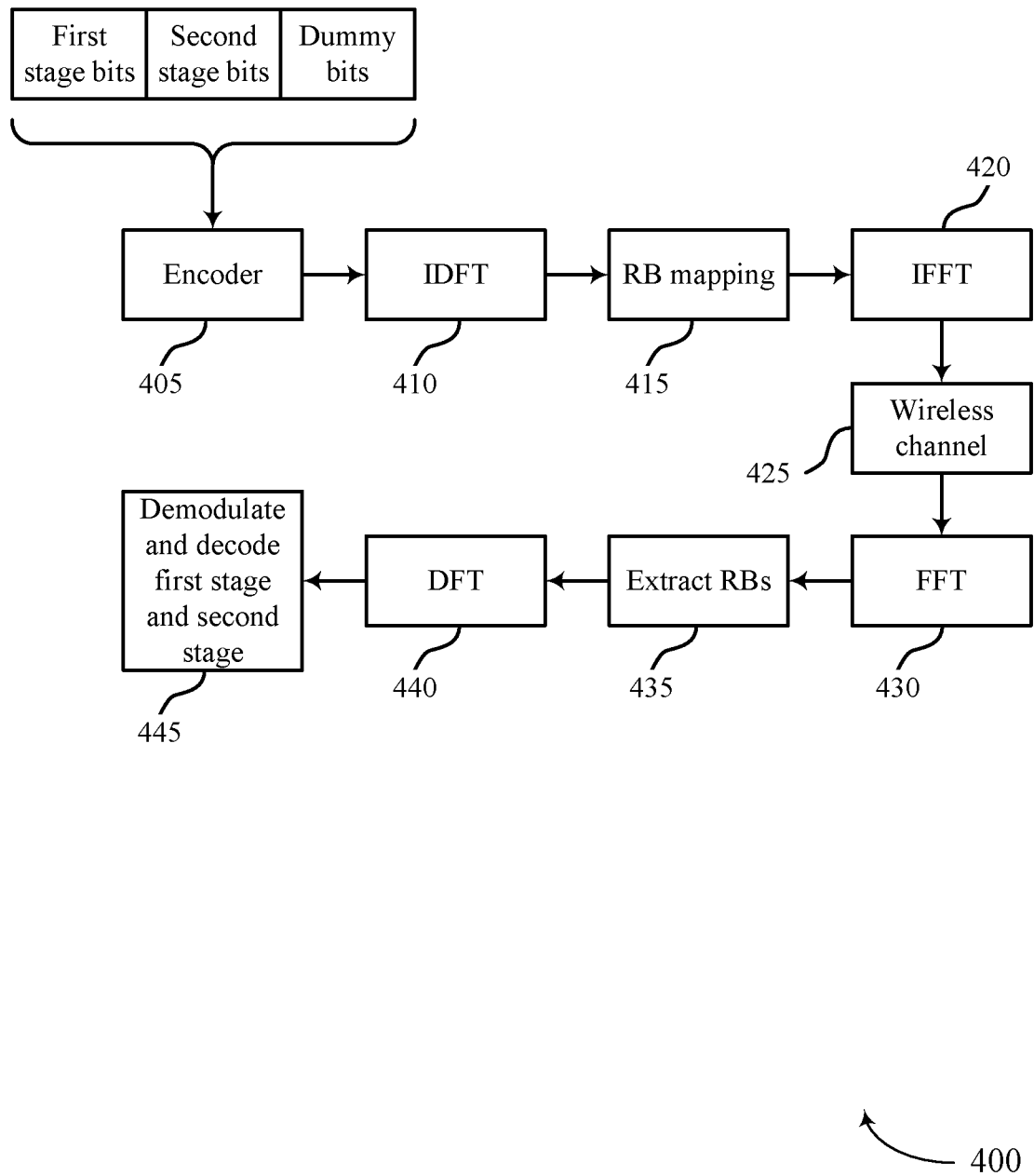
FIG. 4 illustrates an example of a communication diagram that supports two-stage feedback procedures in accordance with aspects of the present disclosure.

FIG. 4 illustrates an example of a communication diagram 400 that supports two-stage feedback procedures in accordance with aspects of the present disclosure. In some examples, the communication diagram 400 may implement aspects of wireless communications systems 100 or 200.

The communication diagram 400 illustrates an example when the first stage and the second stage are jointly encoded. In such examples, at 405, the transmitting device encode bits associated with the first stage, bits associated with the second stage, dummy bits, or any combination thereof, all at one time. The dummy bits may be used to cause the total bit size to be equal to the bit size expected by the encoder for the joint encoding. At 410, the transmitting device may perform an inverse discrete Fourier transform (IDFT). At 415, the transmitting device may map the bits onto a quantity of resource blocks used for the transmission. At 420, the transmitting device may perform an inverse fast Fourier transform (IFFT). At 425, the transmitting device may transmit the signal over a wireless communication medium by the transmitting device. At 430, the receiving device may receive the signal over the wireless channel and may apply a fast Fourier transform (FFT). At 435, the receiving device may extract the resource blocks from the received signal. At 440, the receiving device may apply a discrete Fourier transform (DFT). At 445, the receiving device may demodulate and decode the information associated with the first stage and the second stage at the same time because that information is jointly encoded.

Figure 5:
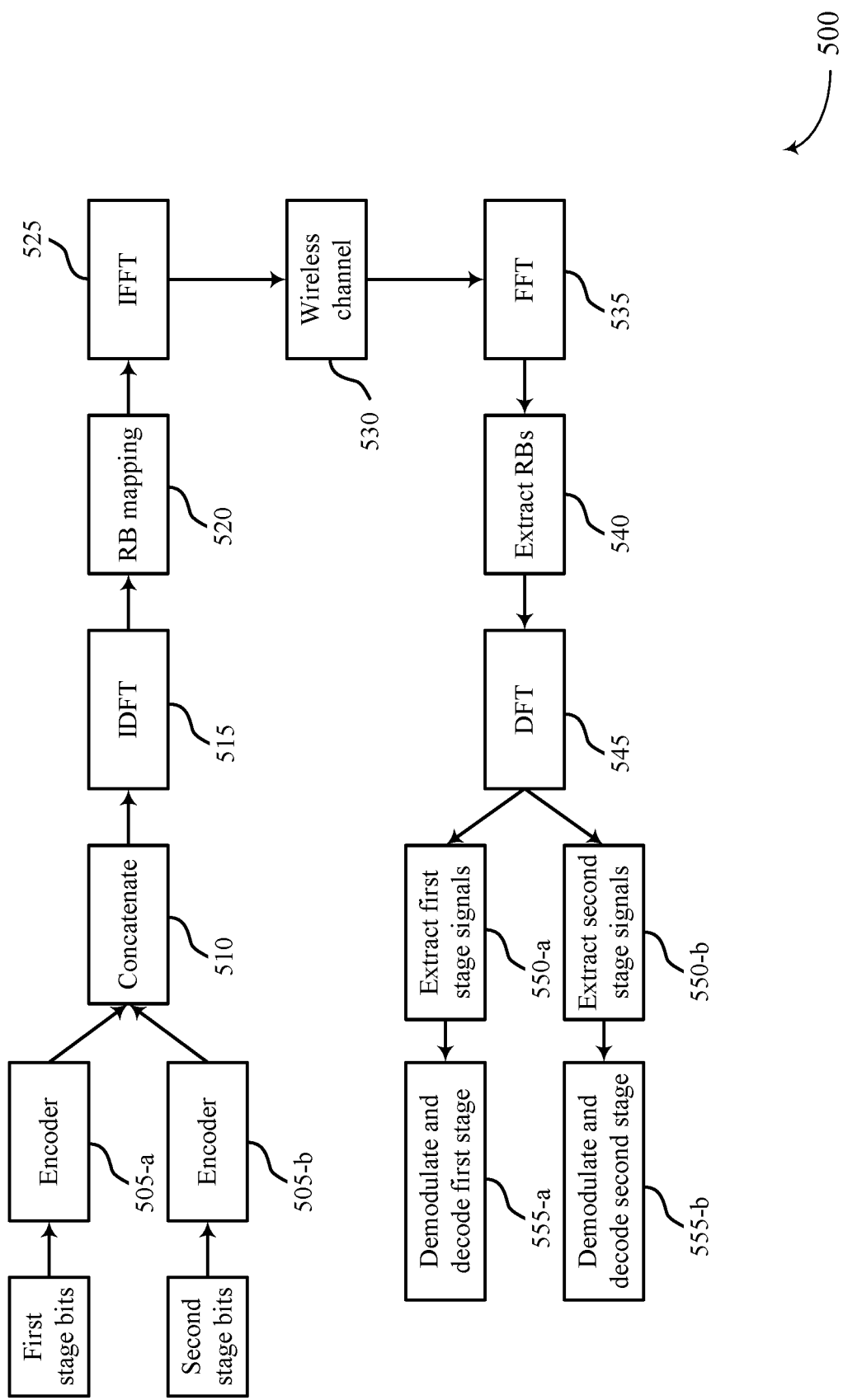
FIG. 5 illustrates an example of a communication diagram that supports two-stage feedback procedures in accordance with aspects of the present disclosure.

FIG. 5 illustrates an example of a communication diagram 500 that supports two-stage feedback procedures in accordance with aspects of the present disclosure. In some examples, the communication diagram 500 may implement aspects of wireless communications systems 100 or 200.

The communication diagram 400 illustrates an example when the first stage and the second stage are encoded separately. In such examples, if dummy bits are needed for the second stage, there are multiple ways to extend the length of the information of the second stage. In a first example, dummy bits may be added to the bits of the second stage. In a second example, the information of the second stage may be encoded with a lower code rate to fill up any remaining resource blocks left over by the first stage and the information of the second stage.

In such examples, at 505-a, the transmitting device may encode the bits of the first stage, and, at 505-b, the transmitting device may separate encode the bits of the second stage. In such examples, different encoding parameters may be used for the first stage than what are used for the second stage. At 510, the transmitting device may concatenate the outputs of the encoding operations performed on the first stage and the second stage. At 515, the transmitting device may perform an IDFT. At 520, the transmitting device may map the bits onto a quantity of resource blocks used for the transmission. At 525, the transmitting device may perform an IFFT. At 530, the transmitting device may transmit the signal over a wireless communication medium by the transmitting device. At 535, the receiving device may receive the signal over the wireless channel and may apply an FFT. At 540, the receiving device may extract the resource blocks from the received signal. At 545, the receiving device may apply a DFT. At 550-a, the receiving device may extract the bits associated with the first stage from the signal after the DFT. At 550-b, the receiving device may extract the bits associated with the second stage form the signal after the DFT. At 555-a, the receiving device may demodulate and decode the information associated with the first stage. At 555-b, the receiving device may demodulate and decode associated and the second stage separately from the demodulating and decoding for the first stage because the information was separately encoded.

Figure 6:
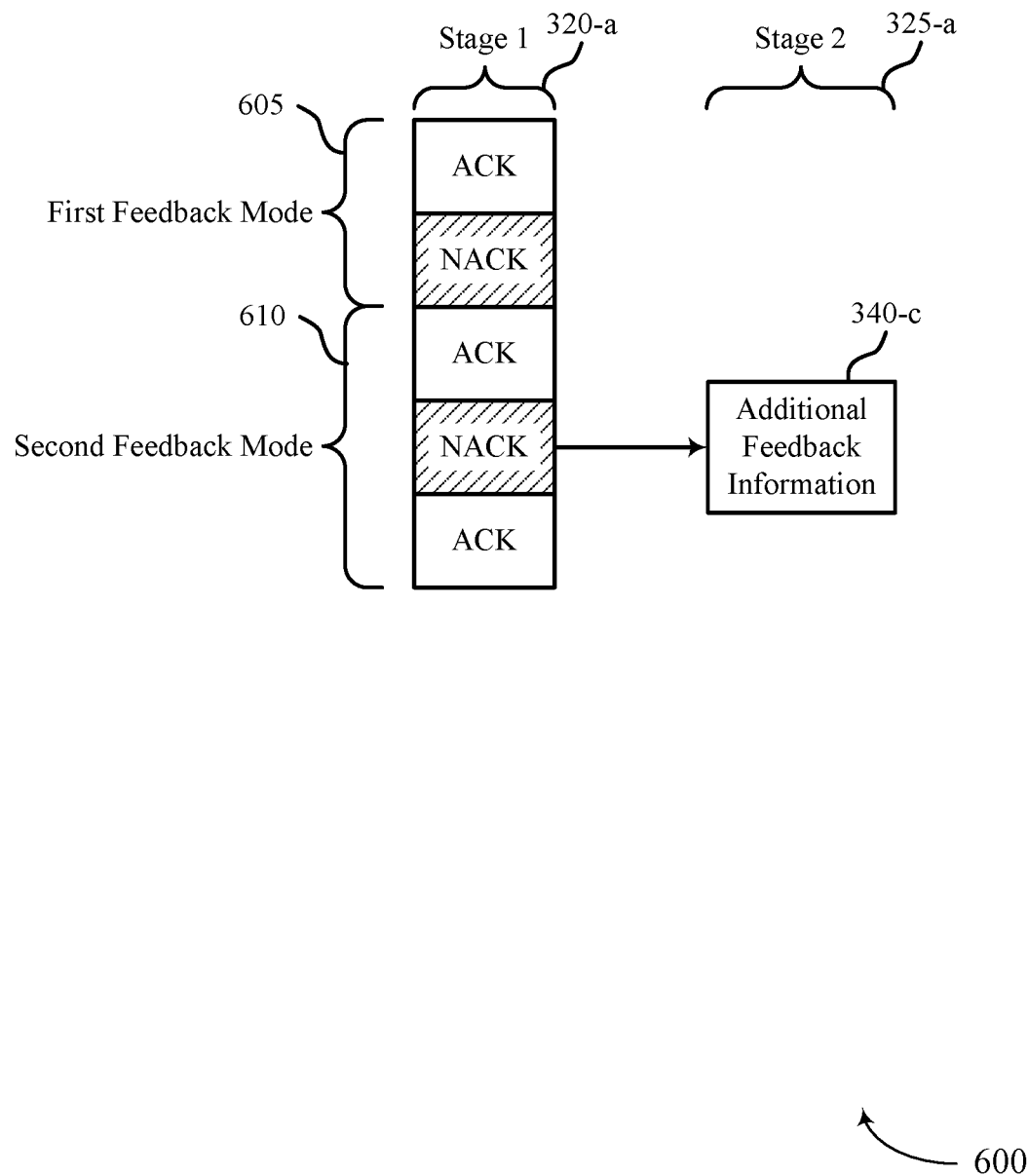
FIG. 6 illustrates an example of a communication diagram that supports two-stage feedback procedures in accordance with aspects of the present disclosure.

FIG. 6 illustrates an example of a communication diagram 600 that supports two-stage feedback procedures in accordance with aspects of the present disclosure. In some examples, the communication diagram 600 may implement aspects of wireless communications systems 100 or 200.

The communication diagram 600 illustrates various aspects of feedback modes related to the two-stage procedure for providing HARQ feedback. Different downlink transmissions (e.g., downlink transmissions 305) that are part of a HARQ procedure may operate according to different feedback modes. Examples of the feedback modes may include a first feedback mode 605 that includes communicating the first stage 320-a of feedback information (e.g., a regular HARQ-ACK mode), a second feedback mode 610 that includes communicating the first stage 320-a of feedback information and the second stage 325-a that includes the additional feedback information 340-c (e.g., enhanced HARQ-ACK mode), and a third feedback mode where portions of a downlink transmission operate using the first feedback mode 605 and other portions of the downlink transmission operate using the second feedback mode 610. In the illustrated example, when operating according to the first feedback mode 605, no additional feedback information is transmitted with a NACK. In contrast, when operating according to the second feedback mode 610, the additional feedback information 340-c associated with a NACK is transmitted.

The feedback modes used by different downlink transmissions may be communicated in a variety of different ways. In some examples, a base station may determine a feedback mode for one or more downlink transmissions and may communicate those feedback modes using a downlink control message. The downlink control message may be an example of DCI, an RRC message, or RRC signaling. In the example of the third feedback mode where portions of the downlink transmission operate according to different modes, additional signaling may be used. In some examples, the downlink control information format used for the first portion indicates the feedback mode of the first portion and the downlink control information format used for the second portion indicates the feedback mode of the second portion. In some examples, one or more indicators in the downlink control information indicates what feedback mode the different portions of the downlink transmission use. For example, an indicator in the DCI may indicate what feedback mode a portion of the downlink transmission uses. Portions of the downlink transmissions may include downlink channels.

The UE may be configured to identify feedback information for each downlink transmission based on the feedback mode associated with the downlink transmission or the portion of the downlink transmission. The UE may identify the feedback modes based on signaling received from the base station. In some examples, independent DAIs may be used to build or generate the feedback information for each feedback mode. For instance, a first DAI may be used for the first feedback mode 605, a second DAI may be used for the second feedback mode 610, and/or a third DAI may be used for the third feedback mode. In some cases, the first DAI and the second DAI may be used for the third feedback mode because the third feedback mode may include both the first feedback mode 605 and the second feedback mode 610.

In some examples, independent codebooks may be used to build or generate the feedback information for each feedback mode. For instance, a first codebook may be used for the first feedback mode 605, a second codebook may be used for the second feedback mode 610, and/or a third codebook may be used for the third feedback mode. In some cases, the first codebook and the second codebook may be used for the third feedback mode because the third feedback mode may include both the first feedback mode 605 and the second feedback mode 610. The UE may identify the feedback information based on using the different codebooks and/or DAIs.

The UE may independently identify the feedback information for each of the different feedback modes in operation and may concatenate or aggregate the feedback information before transmitting it to base station. In such examples, the size of the feedback information may now also vary, not just on the quantity of NACKs and the bit width of the additional feedback information 340, but also depending on what mode each downlink transmission is operating in. The UE and/or the base station may use one or more of the techniques described above to identify the resources used for or a size of the feedback information that includes the first stage 320-a and the second stage 325-a.

Figure 7:
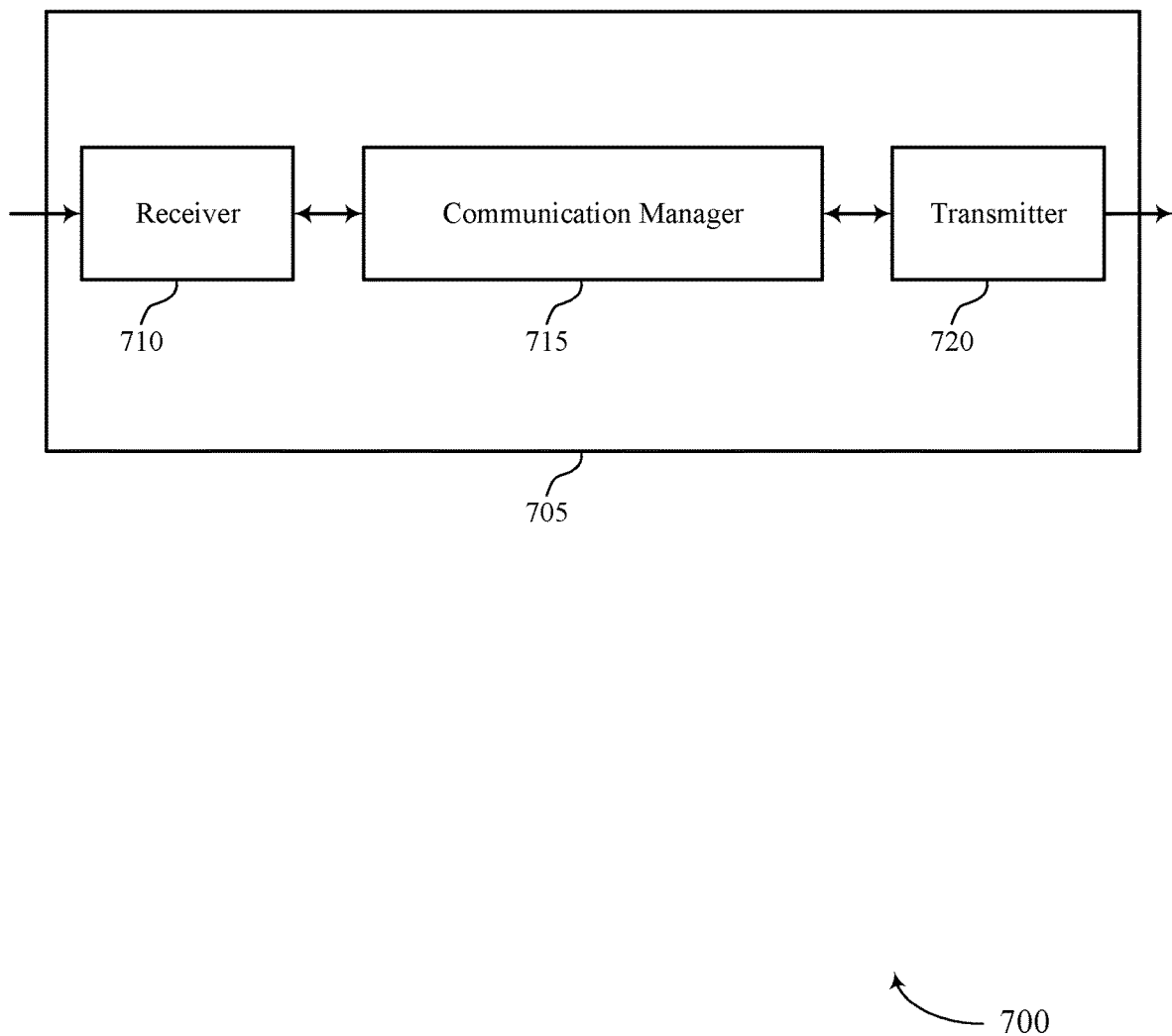
FIGS. 7 and 8 show block diagrams of devices that support two-stage feedback procedures in accordance with aspects of the present disclosure.

FIG. 7 shows a block diagram 700 of a device 705 that supports two-stage feedback procedures in accordance with aspects of the present disclosure. The device 705 may be an example of aspects of a UE 115 as described herein. The device 705 may include a receiver 710, a communication manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to two-stage feedback procedures, etc.). Information may be passed on to other components of the device 705. The receiver 710 may be an example of aspects of the transceiver 1015 described with reference to FIG. 10. The receiver 710 may utilize a single antenna or a set of antennas.

The communication manager 715 may receive one or more signals over one or more component carriers, determine that information associated with a first component carrier of the one or more component carriers failed to be successfully decoded, transmit, using a first set of uplink resources, a first stage of feedback, the first stage including an acknowledgement or a negative acknowledgement associated with each component carrier of the one or more component carriers, and transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof. The communication manager 715 may be an example of aspects of the communication manager 1010 described herein.

The communication manager 715, or its sub-components, may be implemented in hardware, code (e.g., software or firmware) executed by a processor, or any combination thereof. If implemented in code executed by a processor, the functions of the communication manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communication manager 715, or its sub-components, may be physically located at various positions, including being distributed such that portions of functions are implemented at different physical locations by one or more physical components. In some examples, the communication manager 715, or its sub-components, may be a separate and distinct component in accordance with various aspects of the present disclosure. In some examples, the communication manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1015 described with reference to FIG. 10. The transmitter 720 may utilize a single antenna or a set of antennas.

By including or configuring the communication manager 715 in accordance with examples as described herein, the device 705 (e.g., a processor controlling or otherwise coupled to the receiver 710, the communication manager 715, the transmitter 720, or a combination thereof) may reduce processing resources and power consumption associated with feedback procedures. For example, by transmitting two stages of feedback information, the device 705 may reduce processing resources and power consumption by reducing a quantity of retransmissions that occur as part of a HARQ process.

Figure 8:
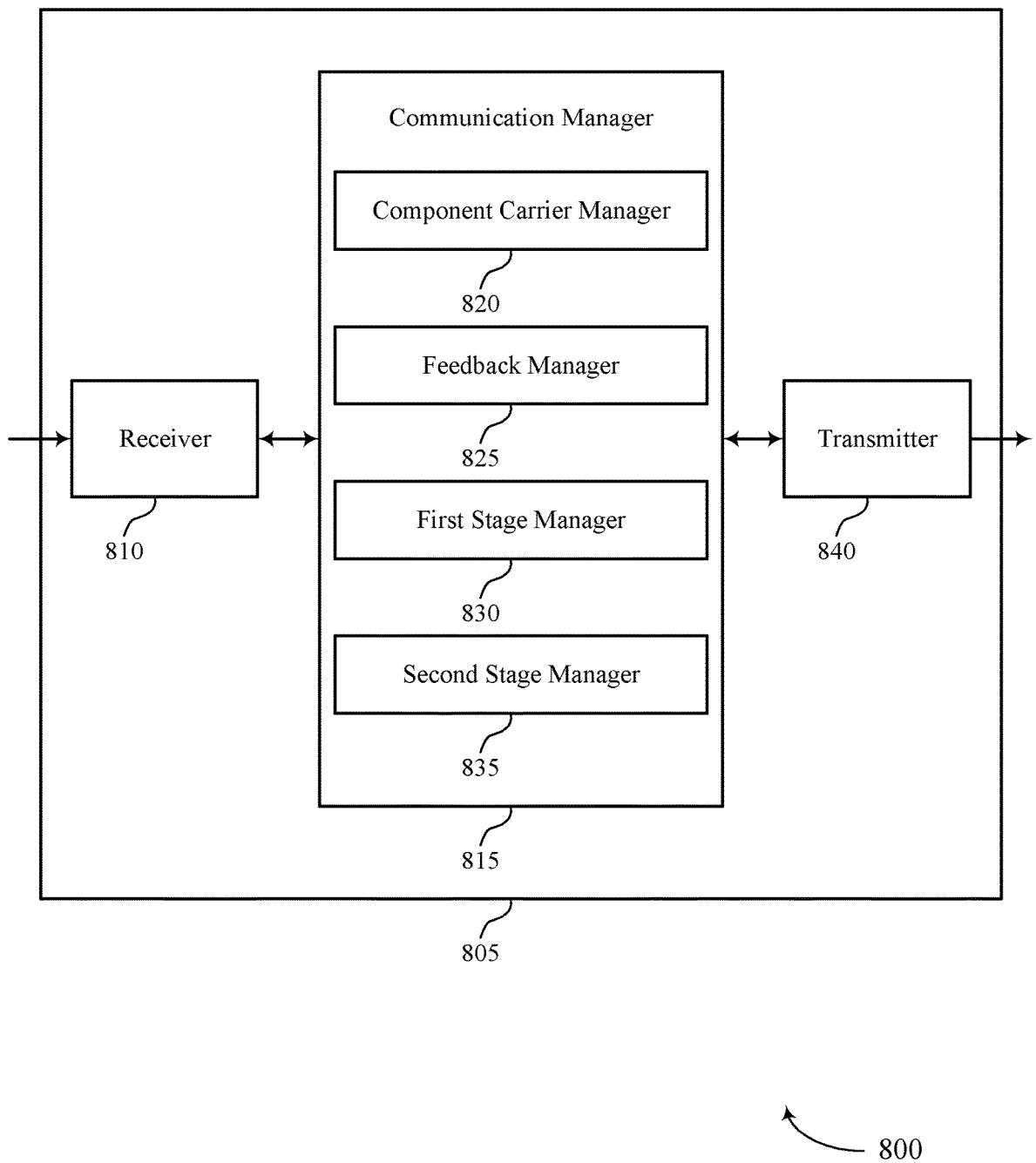

FIG. 8 shows a block diagram 800 of a device 805 that supports two-stage feedback procedures in accordance with aspects of the present disclosure. The device 805 may be an example of aspects of a device 705, or a UE 115 as described herein. The device 805 may include a receiver 810, a communication manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to two-stage feedback procedures, etc.). Information may be passed on to other components of the device 805. The receiver 810 may be an example of aspects of the transceiver 1015 described with reference to FIG. 10. The receiver 810 may utilize a single antenna or a set of antennas.

The communication manager 815 may be an example of aspects of the communication manager 715 as described herein. The communication manager 815 may include a component carrier manager 820, a feedback manager 825, a first stage manager 830, and a second stage manager 835. The communication manager 815 may be an example of aspects of the communication manager 1010 described herein.

The component carrier manager 820 may receive one or more signals over one or more component carriers.

The feedback manager 825 may determine that information associated with a first component carrier of the one or more component carriers failed to be successfully decoded.

The first stage manager 830 may transmit, using a first set of uplink resources, a first stage of feedback, the first stage including an acknowledgement or a negative acknowledgement associated with each component carrier of the one or more component carriers.

The second stage manager 835 may transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof.

The transmitter 840 may transmit signals generated by other components of the device 805. In some examples, the transmitter 840 may be collocated with a receiver 810 in a transceiver module. For example, the transmitter 840 may be an example of aspects of the transceiver 1015 described with reference to FIG. 10. The transmitter 840 may utilize a single antenna or a set of antennas.

Figure 9:
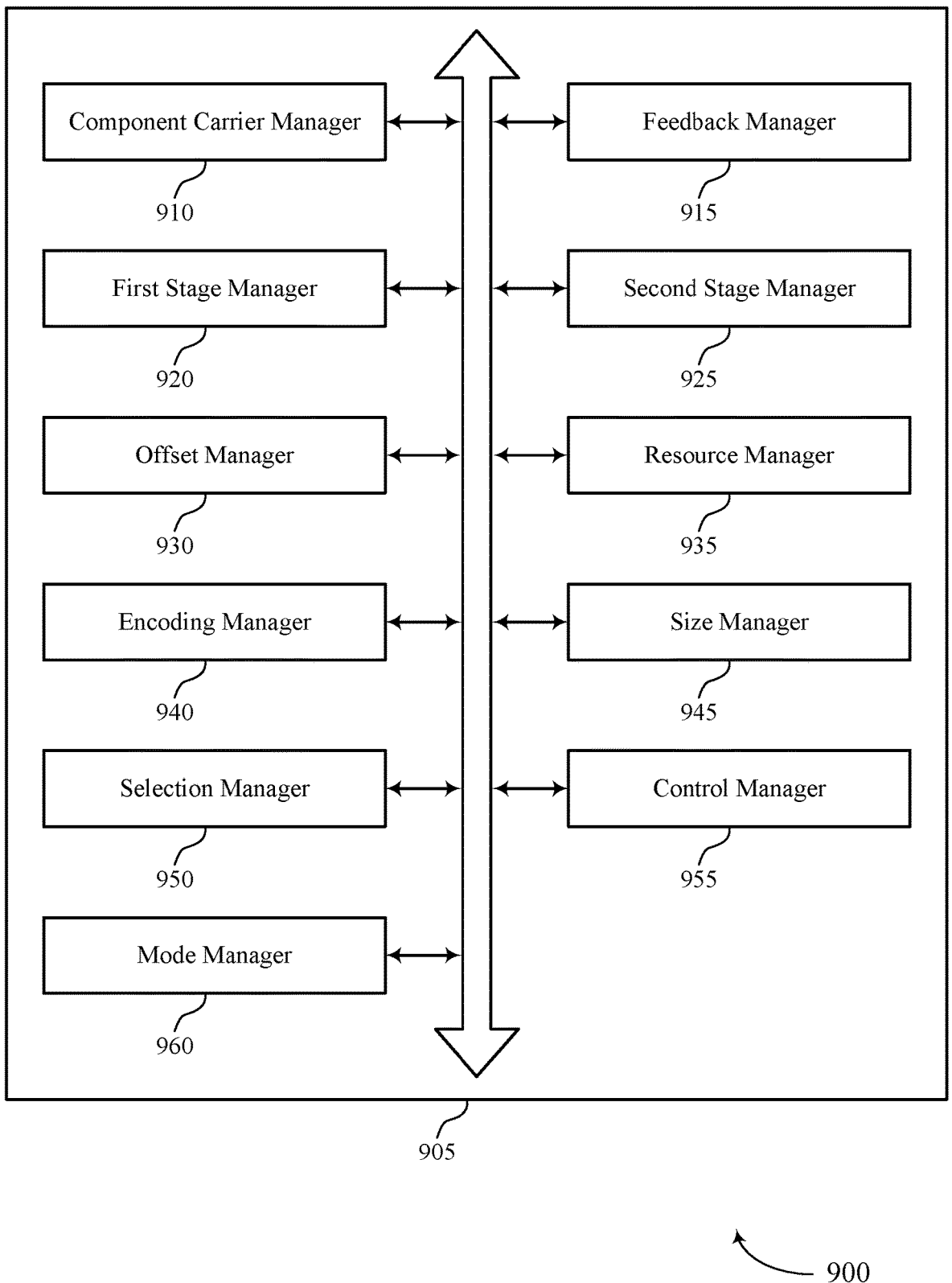
FIG. 9 shows a block diagram of a communication manager that supports two-stage feedback procedures in accordance with aspects of the present disclosure.

FIG. 9 shows a block diagram 900 of a communication manager 905 that supports two-stage feedback procedures in accordance with aspects of the present disclosure. The communication manager 905 may be an example of aspects of a communication manager 715, a communication manager 815, or a communication manager 1010 described herein. The communication manager 905 may include a component carrier manager 910, a feedback manager 915, a first stage manager 920, a second stage manager 925, an offset manager 930, a resource manager 935, an encoding manager 940, a size manager 945, a selection manager 950, a control manager 955, and a mode manager 960. Each of these modules may communicate, directly or indirectly, with one another (e.g., via one or more buses).

The component carrier manager 910 may receive one or more signals over one or more component carriers.

The feedback manager 915 may determine that information associated with a first component carrier of the one or more component carriers failed to be successfully decoded. In some cases, the first set of uplink resources are part of a first physical uplink control channel resource and the second set of uplink resources are part of a second physical uplink control channel resource different than the first physical uplink control channel resource. In some cases, the first set of uplink resources and the second set of uplink resources are part of a same physical uplink control channel resource. In some cases, the first set of uplink resources and the second set of uplink resources are part of a same physical uplink control channel resource and a size of the second set of uplink resources for the second stage is less than or equal to an upper limit. In some cases, the first stage of feedback and the second stage of feedback include stages of hybrid automatic repeat request feedback.

The first stage manager 920 may transmit, using a first set of uplink resources, a first stage of feedback, the first stage including an acknowledgement or a negative acknowledgement associated with each component carrier of the one or more component carriers. In some examples, the first stage manager 920 may identify the first set of uplink resources for the first stage of the feedback based on second information included in a first field of downlink control information, where transmitting the first stage is based on identifying the first set of uplink resources. In some examples, the first stage manager 920 may identify the first set of uplink resources for the first stage of the feedback, where transmitting the first stage is based on identifying the first set of uplink resources.

The second stage manager 925 may transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof. In some examples, the second stage manager 925 may identify the second set of uplink resources for the second stage of the feedback based on third information included in a second field of the downlink control information different than the first field, where transmitting the second stage is based on identifying the second set of uplink resources. In some cases, a first indicator that indicates whether downlink control information for the first component carrier failed to be detected. In some cases, a second indicator that indicates channel information about a physical downlink shared channel of the first component carrier. In some cases, the channel information includes channel state information, channel quality information, precoder information, beam refinement information, or a combination thereof.

The offset manager 930 may identify the second set of uplink resources for the second stage of the feedback based on a resource offset relative to the first set of uplink resources, where transmitting the second stage is based on identifying the second set of uplink resources. In some cases, the resource offset includes a constant slot resource, a constant offset in both a time resource and a frequency resource, a dynamic offset in both the time resource and the frequency resource configured by a radio resource control message, or a dynamic offset in both the time resource and the frequency resource configured by downlink control information, or a combination thereof.

The resource manager 935 may identify a grant-free physical uplink channel resource, where the second set of uplink resources includes the grant-free physical uplink control channel resource, where transmitting the second stage is based on identifying the grant-free physical uplink control channel resource. In some examples, the resource manager 935 may determine that a physical downlink shared channel of the first component carrier failed to be successfully decoded, where the additional feedback information includes an indication of channel information associated with the physical downlink shared channel of the first component carrier that failed to be successfully decoded.

The encoding manager 940 may encode information either separately or jointly. In some cases, the first stage and the second stage are separately encoded. In some cases, the first set of uplink resources associated with the first stage include a first resource block and the second set of uplink resources associated with the second stage include a second resource block different than the first resource block. In some cases, the first set of uplink resources associated with the first stage include a first resource element and the second set of uplink resources associated with the second stage include a second resource element different than the first resource element. In some cases, the first stage and the second stage are jointly encoded. In some cases, the first stage and the second stage are separately encoded. In some cases, the first set of uplink resources associated with the first stage and the second set of uplink resources associated with the first stage are partitioned in the physical uplink control channel resource on a resource block basis, a resource element basis, or a symbol basis. In some cases, the first stage and the second stage are jointly encoded.

The size manager 945 may determine that a size of information for the first stage and the second stage is less than an upper limit of a size of the first set of uplink resources and the second set of uplink resources allocated for transmitting the first stage and the second stage. In some examples, the size manager 945 may append one or more bits to the information for the first stage and the second stage based on determining that the size is less than the upper limit, where transmitting the second stage is based on appending the one or more bits to the information for the first stage and the second stage.

In some examples, the size manager 945 may determine that a size of information for the first stage and the second stage exceeds an upper limit of a size of the first set of uplink resources and the second set of uplink resources allocated for transmitting the first stage and the second stage. In some examples, the size manager 945 may compress the additional feedback information of the second stage based on determining that the size exceeds the upper limit, where transmitting the second stage is based on compressing the additional feedback information. In some examples, the size manager 945 may determine that a second size of the additional feedback information of the second stage exceeds the upper limit of the second set of uplink resources.

In some examples, the size manager 945 may compress the additional feedback information of the second stage based on determining that the second size exceeds the upper limit of the second set of uplink resources, where transmitting the second stage is based on compressing the additional feedback information. In some examples, the size manager 945 may determine that a second size of the additional feedback information of the second stage is less than the upper limit of the second set of uplink resources. In some examples, the size manager 945 may append one or more bits to the additional feedback information for the second stage based on determining that the second size is less than the upper limit, where transmitting the second stage is based on appending the one or more bits to the additional feedback information.

In some examples, the size manager 945 may identify a first bit size of the first stage based on a first quantity of physical downlink shared channels scheduled on the one or more component carriers. In some examples, the size manager 945 may identify a second bit size of the second stage based on a second quantity of negative acknowledgements included in the first stage, where transmitting the second stage is based on identifying the second bit size of the second stage. In some examples, the size manager 945 may identify a bit width for the additional feedback information associated with the first component carrier, where identifying the second bit size is based on identifying the bit width.

The selection manager 950 may select the same physical uplink control channel resource for transmitting the first stage and the second stage based on a second upper limit for a total size of the first stage and the second stage, where transmitting the second stage is based on selecting the same physical uplink control channel resource.

The control manager 955 may determine that downlink control information for the first component carrier failed to be detected, where the additional feedback information includes an indication that the downlink control information for the first component carrier failed to be detected. In some cases, the downlink control information is part of a physical downlink control channel of the first component carrier.

The mode manager 960 may receive a downlink control message that indicates that the first component carrier of the one or more component carriers operates in a first mode for reporting the feedback and that a second component carrier of the one or more component carriers operates in a second mode for reporting the feedback different than the first mode, the first mode including transmitting the first stage of the feedback, and the second mode including transmitting the first stage of the feedback and the second stage of the feedback, where transmitting the second stage is based on the second component carrier operating in the second mode. In some examples, the mode manager 960 may identify the feedback for the first component carrier operating in the first mode using a first codebook. In some examples, the mode manager 960 may identify the feedback for the second component carrier operating in the second mode using a second codebook different than the first codebook.

In some examples, the mode manager 960 may concatenate the feedback for the first component carrier and the feedback for the second component carrier, where transmitting the first stage or transmitting the second stage is based on the concatenation. In some cases, the feedback for the first component carrier operating in the first mode is built using a first downlink assignment index and the feedback for the second component carrier operating in the second mode is built using a second downlink assignment index different than the first downlink assignment index. In some cases, the downlink control message is a radio resource control message. In some cases, the downlink control message indicates that a third component carrier of the one or more component carriers operates in a third mode different than the first mode and the second mode, the third mode including transmitting the first stage of the feedback for a first downlink channel of the third component carrier transmitting the first stage of the feedback and the second stage of the feedback for a second downlink channel of the third component carrier. In some cases, the first downlink channel uses a first downlink control information format and the second downlink channel uses a second downlink control information format different than the first downlink control information format. In some cases, an indicator in the downlink control information for the first downlink channel indicates whether feedback for the first downlink channel includes the second stage.

Figure 10:
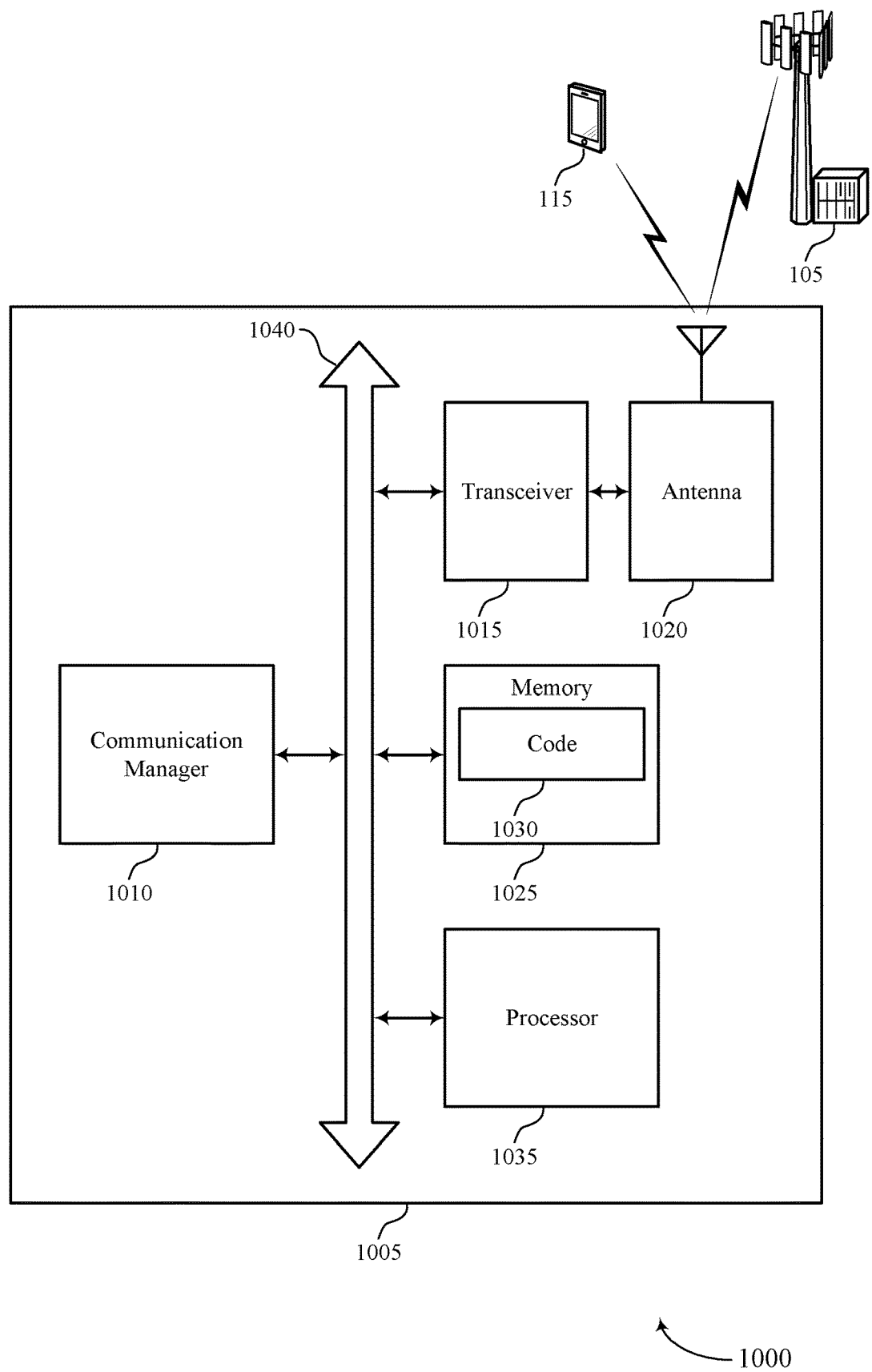
FIG. 10 shows a diagram of a system including a device that supports two-stage feedback procedures in accordance with aspects of the present disclosure.

FIG. 10 shows a diagram of a system 1000 including a device 1005 that supports two-stage feedback procedures in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communication manager 1010, a transceiver 1015, an antenna 1020, memory 1025, and a processor 1035. These components may be in electronic communication via one or more buses (e.g., bus 1040).

The communication manager 1010 may receive one or more signals over one or more component carriers, determine that information associated with a first component carrier of the one or more component carriers failed to be successfully decoded, transmit, using a first set of uplink resources, a first stage of feedback, the first stage including an acknowledgement or a negative acknowledgement associated with each component carrier of the one or more component carriers, and transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof.

By including or configuring the communication manager 1010 in accordance with examples as described herein, the device 1005 may provide improvements to feedback operations. For example, transmitting two stages of feedback may allow the UE to include additional feedback operation information in a feedback transmission. Transmitting the two stages of feedback may promote improvements to efficiency and resource usage of feedback operations and, in some examples, may promote spectral efficiency, increase reliability, increase data rates, reduce latency, reduce power consumption, improve coordination between the UE and a base station, and increase battery life, among other benefits.

The transceiver 1015 may communicate bi-directionally, via one or more antennas, wired, or wireless links as described above. For example, the transceiver 1015 may represent a wireless transceiver and may communicate bi-directionally with another wireless transceiver. The transceiver 1015 may also include a modem to modulate the packets and provide the modulated packets to the antennas for transmission, and to demodulate packets received from the antennas.

In some cases, the wireless device may include a single antenna 1020. However, in some cases the device may have more than one antenna 1020, which may be capable of concurrently transmitting or receiving multiple wireless transmissions.

The memory 1025 may include random-access memory (RAM) and read-only memory (ROM). The memory 1025 may store computer-readable, computer-executable code 1030 including instructions that, when executed, cause the processor to perform various functions described herein. In some cases, the memory 1025 may contain, among other things, a basic I/O system (BIOS) which may control basic hardware or software operation such as the interaction with peripheral components or devices.

The code 1030 may include instructions to implement aspects of the present disclosure, including instructions to support wireless communications. The code 1030 may be stored in a non-transitory computer-readable medium such as system memory or other type of memory. In some cases, the code 1030 may not be directly executable by the processor 1035 but may cause a computer (e.g., when compiled and executed) to perform functions described herein.

The processor 1035 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1035 may be configured to operate a memory array using a memory controller. In other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting two-stage feedback procedures).

Figure 11:
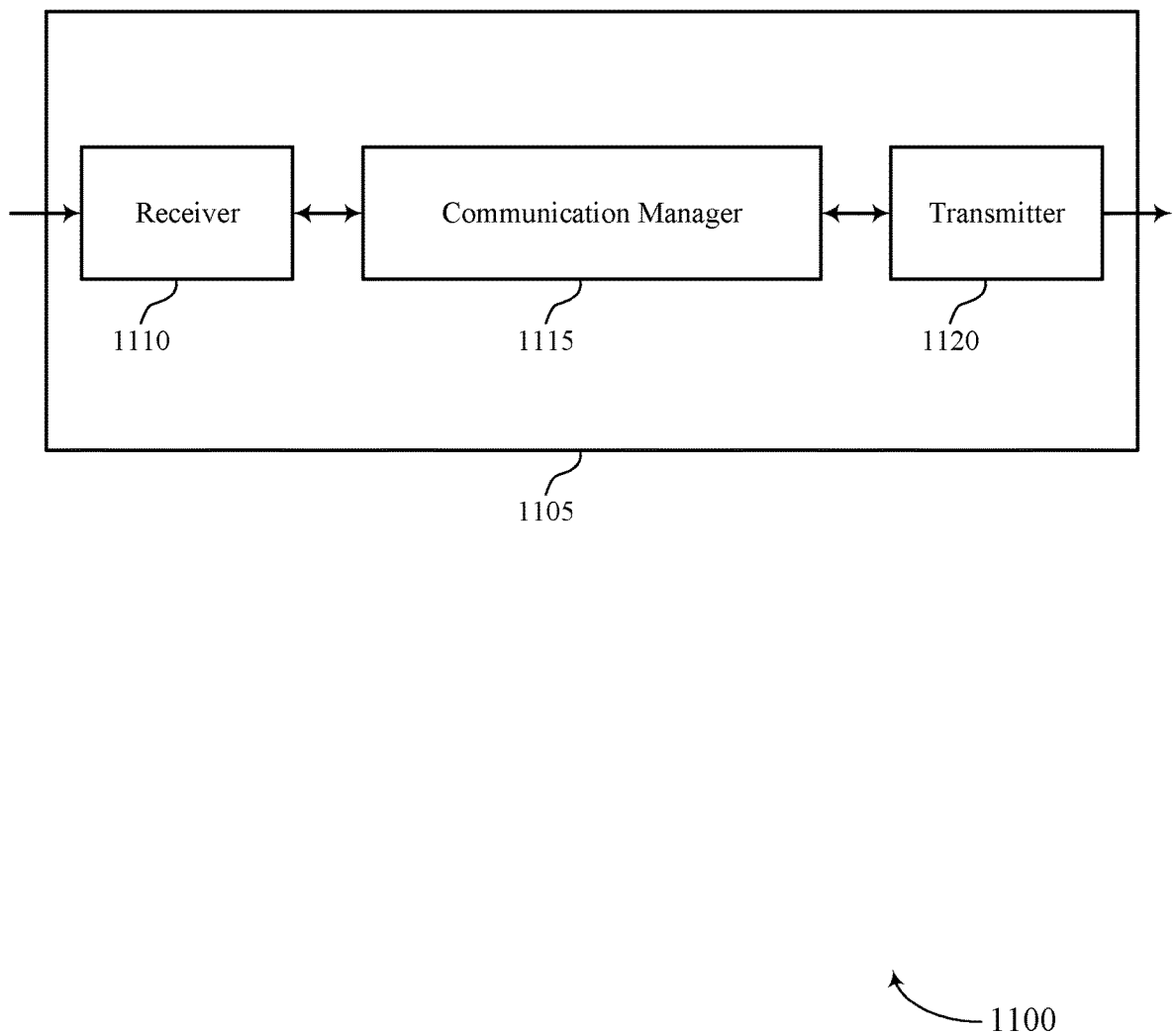
FIGS. 11 and 12 show block diagrams of devices that support two-stage feedback procedures in accordance with aspects of the present disclosure.

FIG. 11 shows a block diagram 1100 of a device 1105 that supports two-stage feedback procedures in accordance with aspects of the present disclosure. The device 1105 may be an example of aspects of a base station 105 as described herein. The device 1105 may include a receiver 1110, a communication manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to two-stage feedback procedures, etc.). Information may be passed on to other components of the device 1105. The receiver 1110 may be an example of aspects of the transceiver 1420 described with reference to FIG. 14. The receiver 1110 may utilize a single antenna or a set of antennas.

The communication manager 1115 may transmit one or more signals over one or more component carriers, receive, using a first set of uplink resources, a first stage of feedback, the first stage including an acknowledgement or a negative acknowledgement associated with each component carrier of the one or more component carriers, receive, using a second set of uplink resources different than the first set of uplink resources, a second stage of the feedback, the second stage including additional feedback information associated with a first component carrier associated with a first negative acknowledgement of the first stage, adjust one or more parameters associated with the first component carrier based on the additional feedback information included in the second stage, and transmit a first signal over the first component carrier based on adjusting the one or more parameters. The communication manager 1115 may be an example of aspects of the communication manager 1410 described herein.

The communication manager 1115, or its sub-components, may be implemented in hardware, code (e.g., software or firmware) executed by a processor, or any combination thereof. If implemented in code executed by a processor, the functions of the communication manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communication manager 1115, or its sub-components, may be physically located at various positions, including being distributed such that portions of functions are implemented at different physical locations by one or more physical components. In some examples, the communication manager 1115, or its sub-components, may be a separate and distinct component in accordance with various aspects of the present disclosure. In some examples, the communication manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

By including or configuring the communication manager 1115 in accordance with examples as described herein, the device 1105 (e.g., a processor controlling or otherwise coupled to the receiver 1110, the communication manager 1115, the transmitter 1120, or a combination thereof) may reduce processing resources and power consumption associated with feedback procedures. For example, by transmitting two stages of feedback information, the device 1105 may reduce processing resources and power consumption by reducing a quantity of retransmissions that occur as part of a HARQ process.

Figure 12:
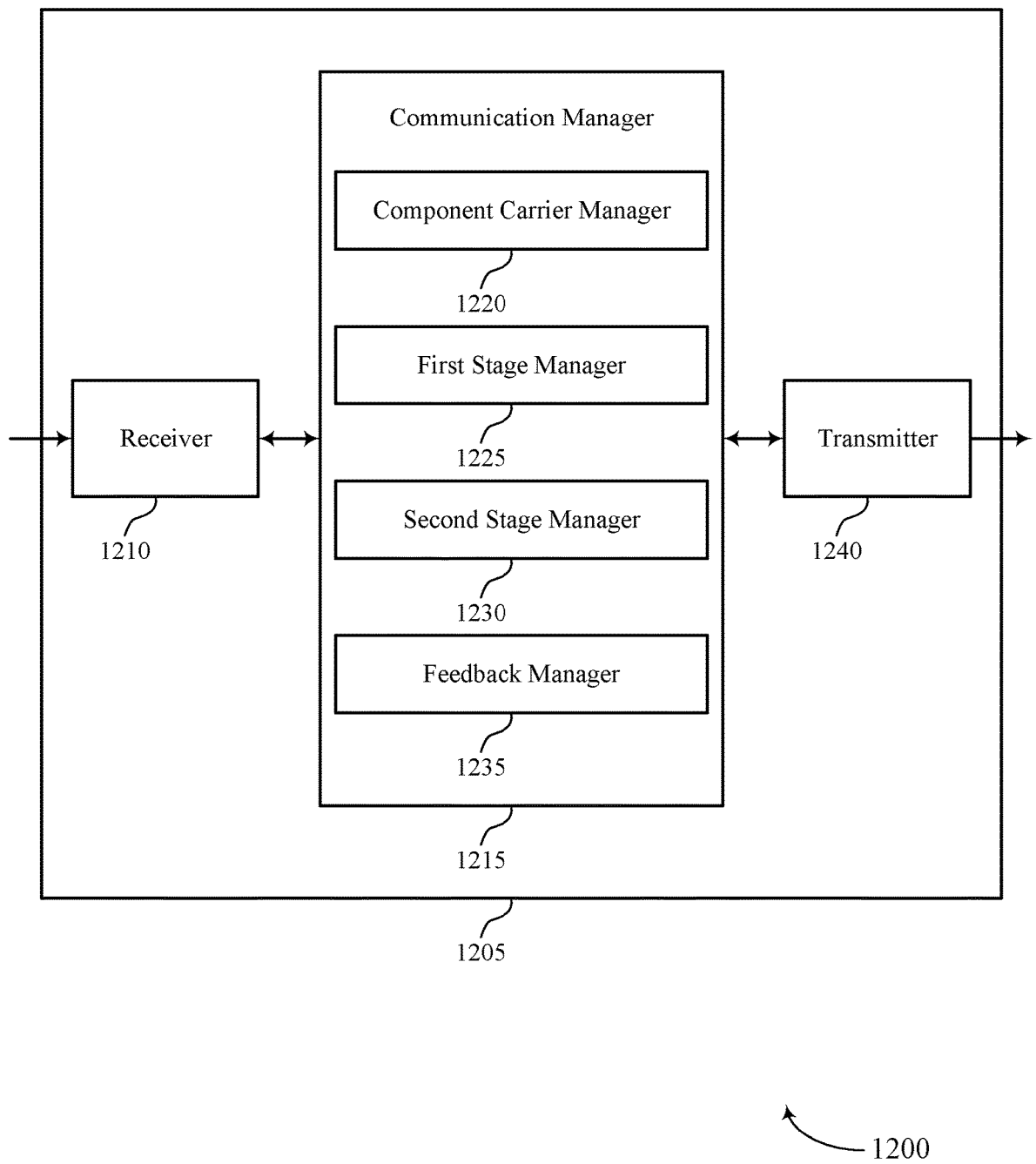

FIG. 12 shows a block diagram 1200 of a device 1205 that supports two-stage feedback procedures in accordance with aspects of the present disclosure. The device 1205 may be an example of aspects of a device 1105, or a base station 105 as described herein. The device 1205 may include a receiver 1210, a communication manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to two-stage feedback procedures, etc.). Information may be passed on to other components of the device 1205. The receiver 1210 may be an example of aspects of the transceiver 1420 described with reference to FIG. 14. The receiver 1210 may utilize a single antenna or a set of antennas.

The communication manager 1215 may be an example of aspects of the communication manager 1115 as described herein. The communication manager 1215 may include a component carrier manager 1220, a first stage manager 1225, a second stage manager 1230, and a feedback manager 1235. The communication manager 1215 may be an example of aspects of the communication manager 1410 described herein.

The component carrier manager 1220 may transmit one or more signals over one or more component carriers.

The first stage manager 1225 may receive, using a first set of uplink resources, a first stage of feedback, the first stage including an acknowledgement or a negative acknowledgement associated with each component carrier of the one or more component carriers.

The second stage manager 1230 may receive, using a second set of uplink resources different than the first set of uplink resources, a second stage of the feedback, the second stage including additional feedback information associated with a first component carrier associated with a first negative acknowledgement of the first stage.

The feedback manager 1235 may adjust one or more parameters associated with the first component carrier based on the additional feedback information included in the second stage.

The component carrier manager 1220 may transmit a first signal over the first component carrier based on adjusting the one or more parameters.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
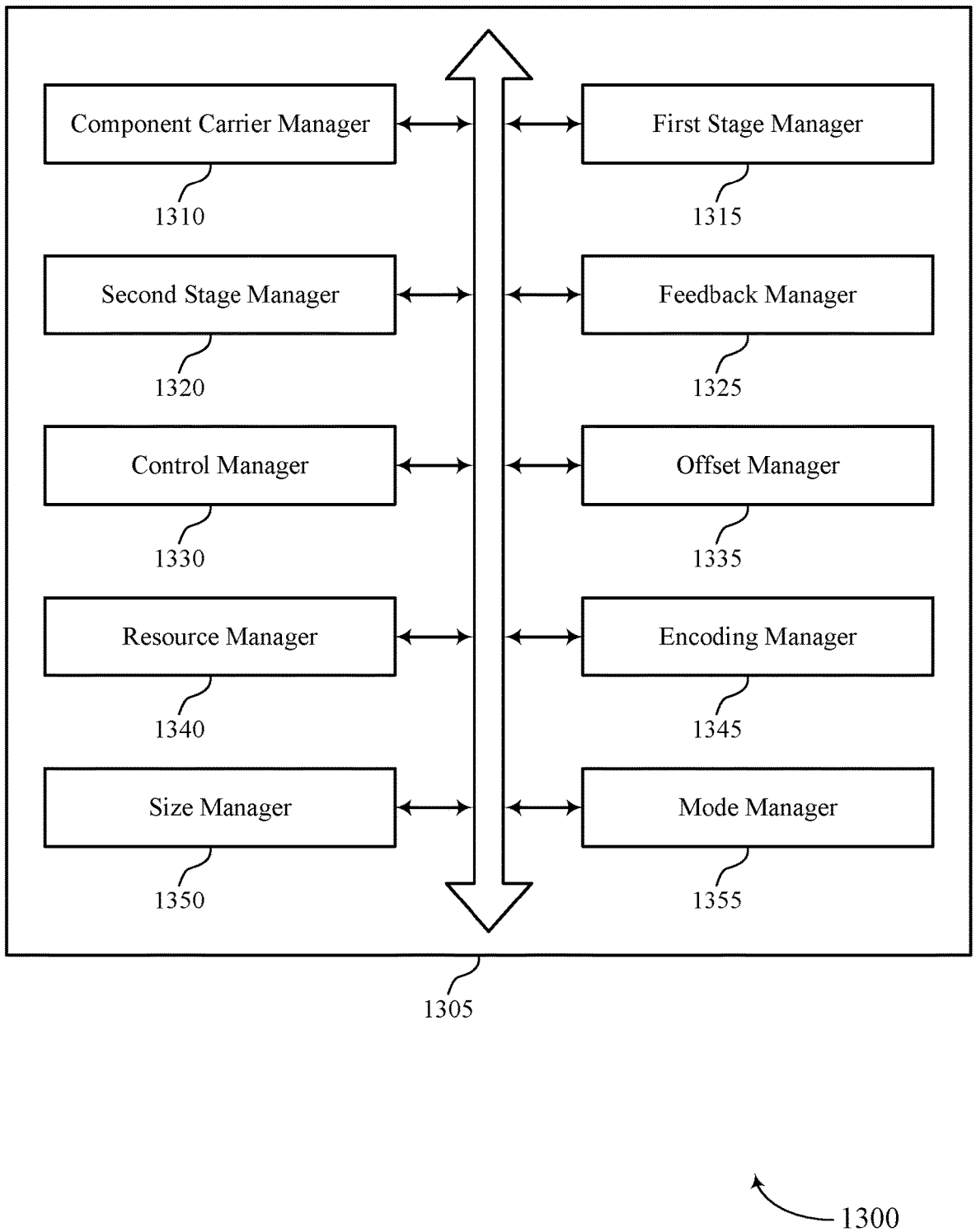
FIG. 13 shows a block diagram of a communication manager that supports two-stage feedback procedures in accordance with aspects of the present disclosure.

FIG. 13 shows a block diagram 1300 of a communication manager 1305 that supports two-stage feedback procedures in accordance with aspects of the present disclosure. The communication manager 1305 may be an example of aspects of a communication manager 1115, a communication manager 1215, or a communication manager 1410 described herein. The communication manager 1305 may include a component carrier manager 1310, a first stage manager 1315, a second stage manager 1320, a feedback manager 1325, a control manager 1330, an offset manager 1335, a resource manager 1340, an encoding manager 1345, a size manager 1350, and a mode manager 1355. Each of these modules may communicate, directly or indirectly, with one another (e.g., via one or more buses).

The component carrier manager 1310 may transmit one or more signals over one or more component carriers.

The first stage manager 1315 may receive, using a first set of uplink resources, a first stage of feedback, the first stage including an acknowledgement or a negative acknowledgement associated with each component carrier of the one or more component carriers. In some examples, the first stage manager 1315 may identify the first set of uplink resources for the first stage of the feedback. In some cases, a first indicator that indicates whether downlink control information for the first component carrier failed to be detected.

The second stage manager 1320 may receive, using a second set of uplink resources different than the first set of uplink resources, a second stage of the feedback, the second stage including additional feedback information associated with a first component carrier associated with a first negative acknowledgement of the first stage. In some examples, the second stage manager 1320 may identify the second set of uplink resources for the second stage of the feedback. In some examples, identifying, in the additional feedback information of the second stage, an indication that downlink control information for the first component carrier failed to be detected, where adjusting the one or more parameters includes adjusting one or more transmission parameters of a physical downlink control channel associated with the first component carrier based on identifying the indication. In some cases, a second indicator that indicates channel information about a physical downlink shared channel of the first component carrier. In some cases, the channel information includes channel state information, channel quality information, precoder information, beam refinement information, or a combination thereof.

The feedback manager 1325 may adjust one or more parameters associated with the first component carrier based on the additional feedback information included in the second stage. In some examples, the component carrier manager 1310 may transmit a first signal over the first component carrier based on adjusting the one or more parameters.

In some cases, the first set of uplink resources are part of a first physical uplink control channel resource and the second set of uplink resources are part of a second physical uplink control channel resource different than the first physical uplink control channel resource. In some cases, the first set of uplink resources and the second set of uplink resources are part of a same physical uplink control channel resource. In some cases, the first set of uplink resources and the second set of uplink resources are part of a same physical uplink control channel resource and a size of the second set of uplink resources for the second stage is less than or equal to an upper limit. In some cases, the downlink control information is part of a second physical downlink control channel of the first component carrier. In some cases, the first stage of feedback and the second stage of feedback include stages of hybrid automatic repeat request feedback.

The control manager 1330 may transmit downlink control information that includes a first field indicating the first set of uplink resources and a second field indicating the second set of uplink resources, the second field different that than the first field, where receiving the first stage and the second stage is based on transmitting the downlink control information.

The offset manager 1335 may transmit downlink control information indicating a resource offset between the first set of uplink resources and the second set of uplink resources, where receiving the first stage and the second stage is based on transmitting the downlink control information. In some cases, the resource offset includes a constant slot resource, a constant offset in both a time resource and a frequency resource, a dynamic offset in both the time resource and the frequency resource configured by a radio resource control message, or a dynamic offset in both the time resource and the frequency resource configured by downlink control information, or a combination thereof.

The resource manager 1340 may receive a grant-free physical uplink channel resource that includes the second set of uplink resources. In some examples, identifying, in the additional feedback information of the second stage, an indication of channel information associated with a first physical downlink shared channel of the first component carrier that failed to be successfully decoded, where adjusting the one or more parameters includes adjusting one or more transmission parameters of a second physical downlink shared channel associated with the first component carrier based on identifying the indication.

The encoding manager 1345 may encode information either separately or jointly. In some cases, the first stage and the second stage are separately encoded. In some cases, the first set of uplink resources associated with the first stage include a first resource block and the second set of uplink resources associated with the second stage include a second resource block different than the first resource block. In some cases, the first set of uplink resources associated with the first stage include a first resource element and the second set of uplink resources associated with the second stage include a second resource element different than the first resource element. In some cases, the first stage and the second stage are jointly encoded. In some cases, the first stage and the second stage are separately encoded. In some cases, the first set of uplink resources associated with the first stage and the second set of uplink resources associated with the first stage are partitioned in the physical uplink control channel resource on a resource block basis, a resource element basis, or a symbol basis. In some cases, the first stage and the second stage are jointly encoded.

The size manager 1350 may determine that a size of information for the first stage and the second stage is less than an upper limit of a size of the first set of uplink resources and the second set of uplink resources allocated for transmitting the first stage and the second stage, where receiving the second stage includes receiving the additional feedback information that has been appended. In some examples, the size manager 1350 may determine that a size of information for the first stage and the second stage exceeds an upper limit of a size of the first set of uplink resources and the second set of uplink resources allocated for transmitting the first stage and the second stage, where receiving the second stage includes receiving the additional feedback information that has been compressed. In some examples, the size manager 1350 may determine that a second size of the additional feedback information of the second stage exceeds the upper limit of the second set of uplink resources, where receiving the second stage includes receiving the additional feedback information that has been compressed. In some examples, the size manager 1350 may determine that a second size of the additional feedback information of the second stage is less than the upper limit of the second set of uplink resources, where receiving the second stage includes receiving the additional feedback information that has been appended.

In some examples, the size manager 1350 may identify a first bit size of the first stage based on a first quantity of physical downlink shared channels scheduled on the one or more component carriers. In some examples, the size manager 1350 may identify a second bit size of the second stage based on a second quantity of negative acknowledgements included in the first stage, where receiving the second stage is based on identifying the second bit size of the second stage. In some examples, the size manager 1350 may identify a bit width for the feedback information associated with the first component carrier, where identifying the second bit size is based on identifying the bit width. In some cases, the same physical uplink control channel resource is selected for transmitting the first stage and the second stage based on a second upper limit for a total size of the first stage and the second stage.

The mode manager 1355 may transmit a downlink control message that indicates that the first component carrier of the one or more component carriers operates in a first mode for reporting the feedback and that a second component carrier of the one or more component carriers operates in a second mode for reporting the feedback different than the first mode, the first mode including transmitting the first stage of the feedback and the second mode including transmitting the first stage of the feedback and the second stage of the feedback, where receiving the second stage is based on the second component carrier operating in the second mode. In some cases, the feedback for the first component carrier operating in the first mode is built using a first downlink assignment index and the feedback for the second component carrier operating in the second mode is built using a second downlink assignment index different than the first downlink assignment index. In some cases, the downlink control message is a radio resource control message. In some cases, the first downlink channel uses a first downlink control information format and the second downlink channel uses a second downlink control information format different than the first downlink control information format. In some cases, an indicator in the downlink control information for the first downlink channel indicates whether feedback for the first downlink channel includes the second stage.

Figure 14:
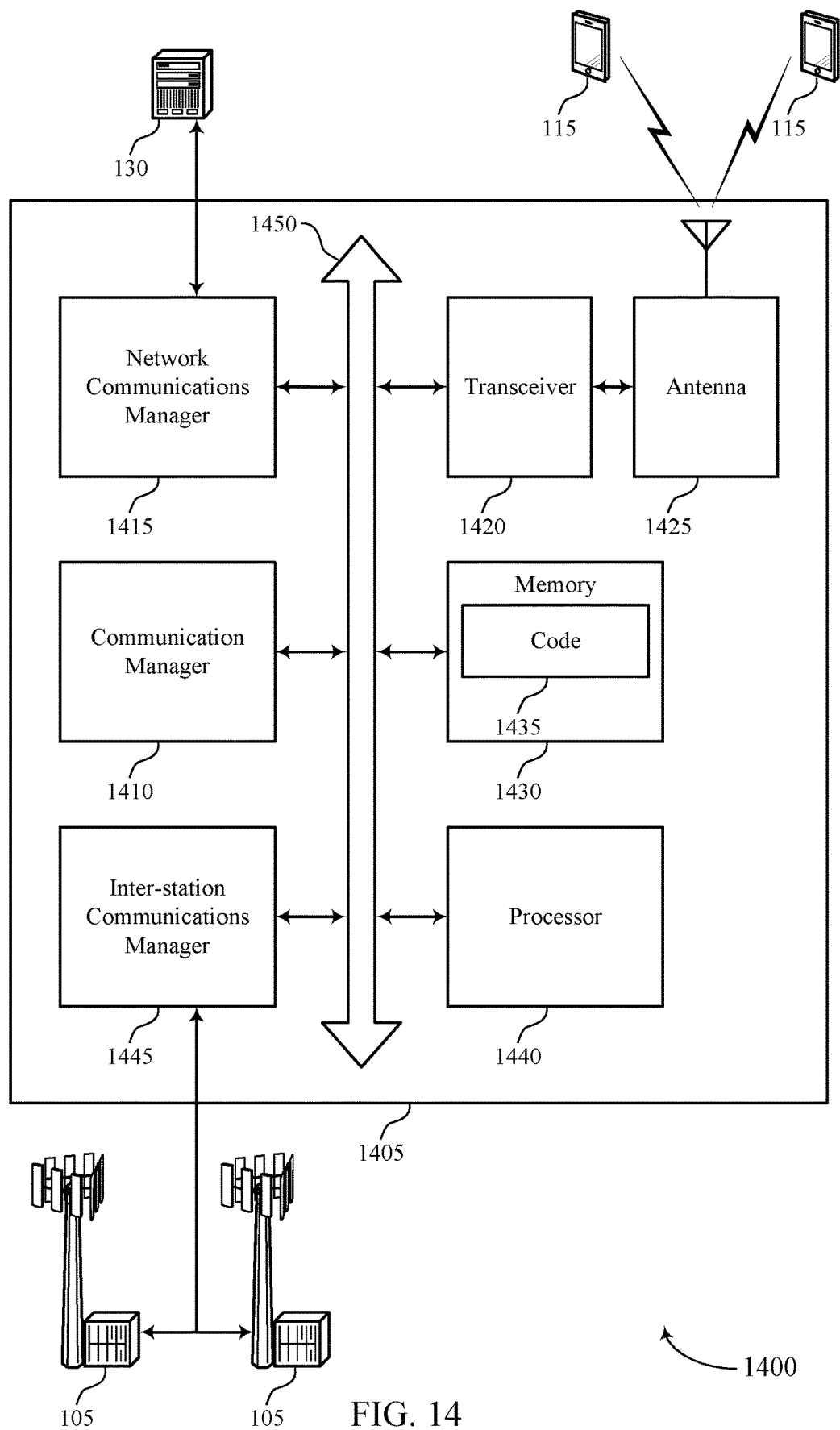
FIG. 14 shows a diagram of a system including a device that supports two-stage feedback procedures in accordance with aspects of the present disclosure.

FIG. 14 shows a diagram of a system 1400 including a device 1405 that supports two-stage feedback procedures in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communication manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communication manager 1410 may transmit one or more signals over one or more component carriers, receive, using a first set of uplink resources, a first stage of feedback, the first stage including an acknowledgement or a negative acknowledgement associated with each component carrier of the one or more component carriers, receive, using a second set of uplink resources different than the first set of uplink resources, a second stage of the feedback, the second stage including additional feedback information associated with a first component carrier associated with a first negative acknowledgement of the first stage, adjust one or more parameters associated with the first component carrier based on the additional feedback information included in the second stage, and transmit a first signal over the first component carrier based on adjusting the one or more parameters.

By including or configuring the communication manager 1410 in accordance with examples as described herein, the device 1405 may provide improvements to feedback operations. For example, receiving two stages of feedback may allow a UE to include additional feedback operation information in a feedback transmission. Receiving the two stages of feedback may promote improvements to efficiency and resource usage of feedback operations and, in some examples, may promote spectral efficiency, increase reliability, increase data rates, reduce latency, reduce power consumption, and improve coordination between the device 1405 and the UE, among other benefits.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting two-stage feedback procedures).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
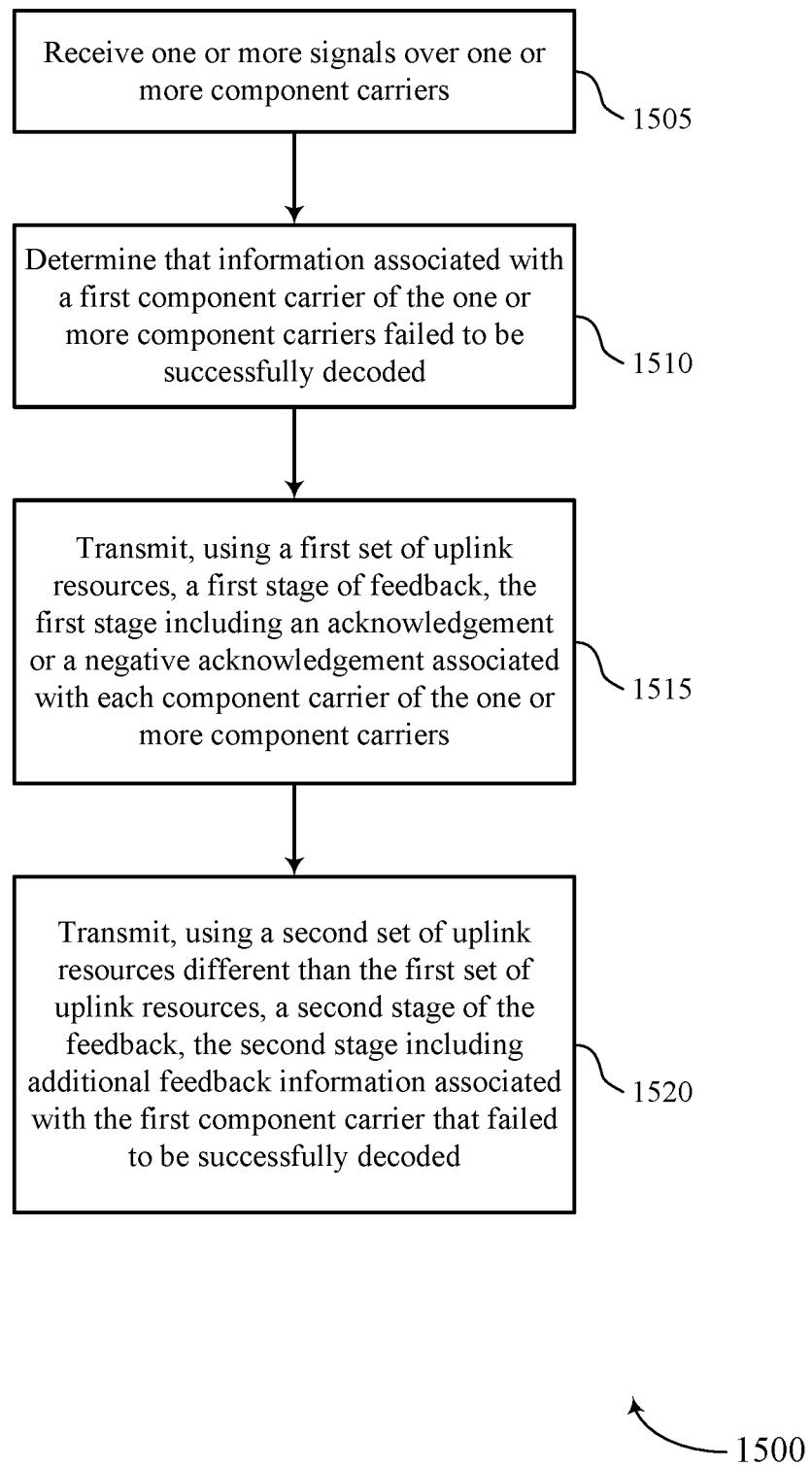
FIGS. 15 through 21 show flowcharts illustrating methods that support two-stage feedback procedures in accordance with aspects of the present disclosure.

FIG. 15 shows a flowchart illustrating a method 1500 that supports two-stage feedback procedures in accordance with aspects of the present disclosure. The operations of method 1500 may be implemented by a UE 115 or its components as described herein. For example, the operations of method 1500 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1505, the UE may receive one or more signals over one or more component carriers. The operations of 1505 may be performed according to the methods described herein. In some examples, aspects of the operations of 1505 may be performed by a component carrier manager as described with reference to FIGS. 7 through 10.

At 1510, the UE may determine that information associated with a first component carrier of the one or more component carriers failed to be successfully decoded. The operations of 1510 may be performed according to the methods described herein. In some examples, aspects of the operations of 1510 may be performed by a feedback manager as described with reference to FIGS. 7 through 10.

At 1515, the UE may transmit, using a first set of uplink resources, a first stage of feedback, the first stage including an acknowledgement or a negative acknowledgement associated with each component carrier of the one or more component carriers. The operations of 1515 may be performed according to the methods described herein. In some examples, aspects of the operations of 1515 may be performed by a first stage manager as described with reference to FIGS. 7 through 10.

At 1520, the UE may transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof. The operations of 1520 may be performed according to the methods described herein. In some examples, aspects of the operations of 1520 may be performed by a second stage manager as described with reference to FIGS. 7 through 10.

Figure 16:
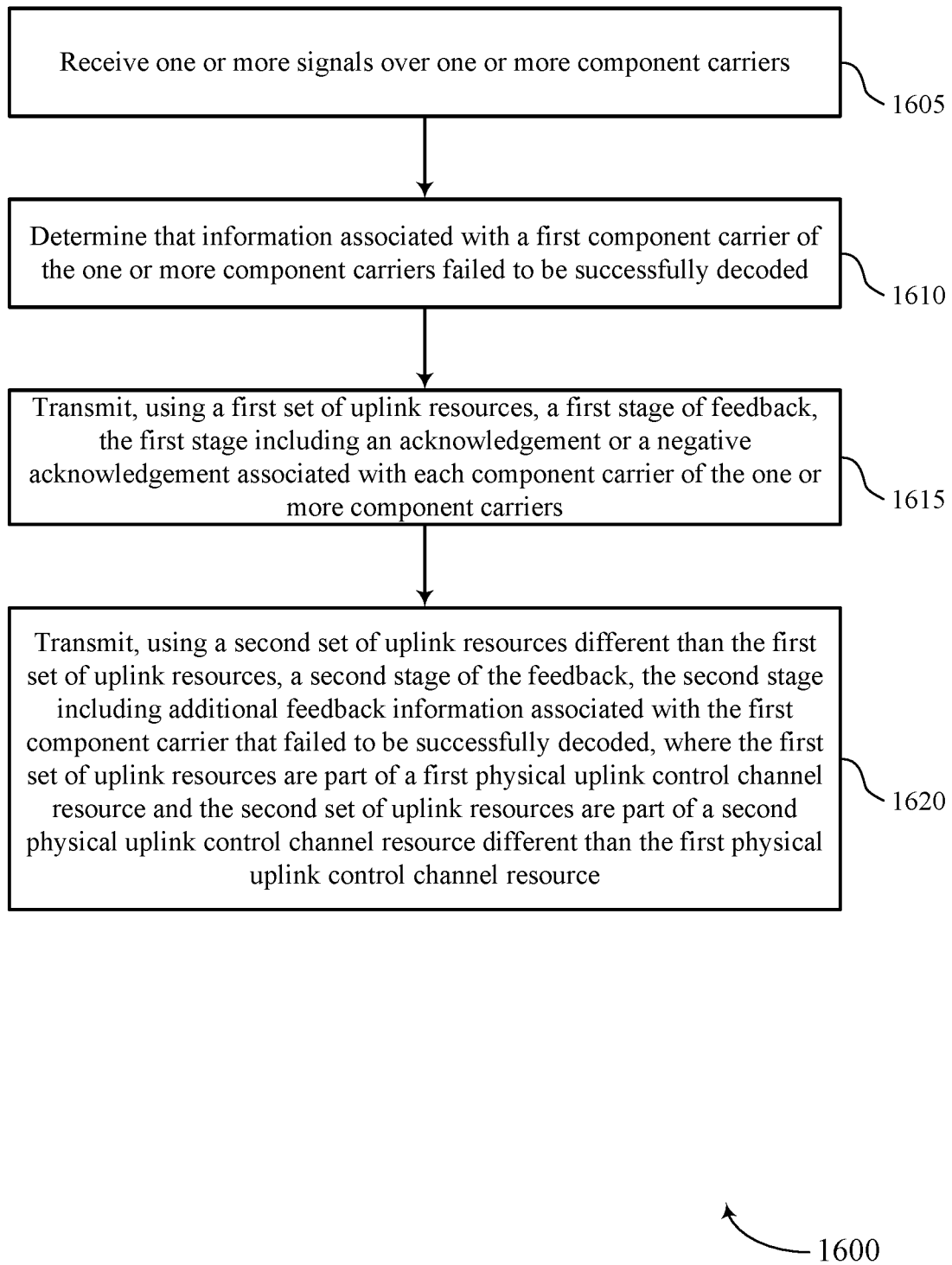

FIG. 16 shows a flowchart illustrating a method 1600 that supports two-stage feedback procedures in accordance with aspects of the present disclosure. The operations of method 1600 may be implemented by a UE 115 or its components as described herein. For example, the operations of method 1600 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1605, the UE may receive one or more signals over one or more component carriers. The operations of 1605 may be performed according to the methods described herein. In some examples, aspects of the operations of 1605 may be performed by a component carrier manager as described with reference to FIGS. 7 through 10.

At 1610, the UE may determine that information associated with a first component carrier of the one or more component carriers failed to be successfully decoded. The operations of 1610 may be performed according to the methods described herein. In some examples, aspects of the operations of 1610 may be performed by a feedback manager as described with reference to FIGS. 7 through 10.

At 1615, the UE may transmit, using a first set of uplink resources, a first stage of feedback, the first stage including an acknowledgement or a negative acknowledgement associated with each component carrier of the one or more component carriers. The operations of 1615 may be performed according to the methods described herein. In some examples, aspects of the operations of 1615 may be performed by a first stage manager as described with reference to FIGS. 7 through 10.

At 1620, the UE may transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof, where the first set of uplink resources are part of a first physical uplink control channel resource and the second set of uplink resources are part of a second physical uplink control channel resource different than the first physical uplink control channel resource. The operations of 1620 may be performed according to the methods described herein. In some examples, aspects of the operations of 1620 may be performed by a second stage manager as described with reference to FIGS. 7 through 10.

Figure 17:
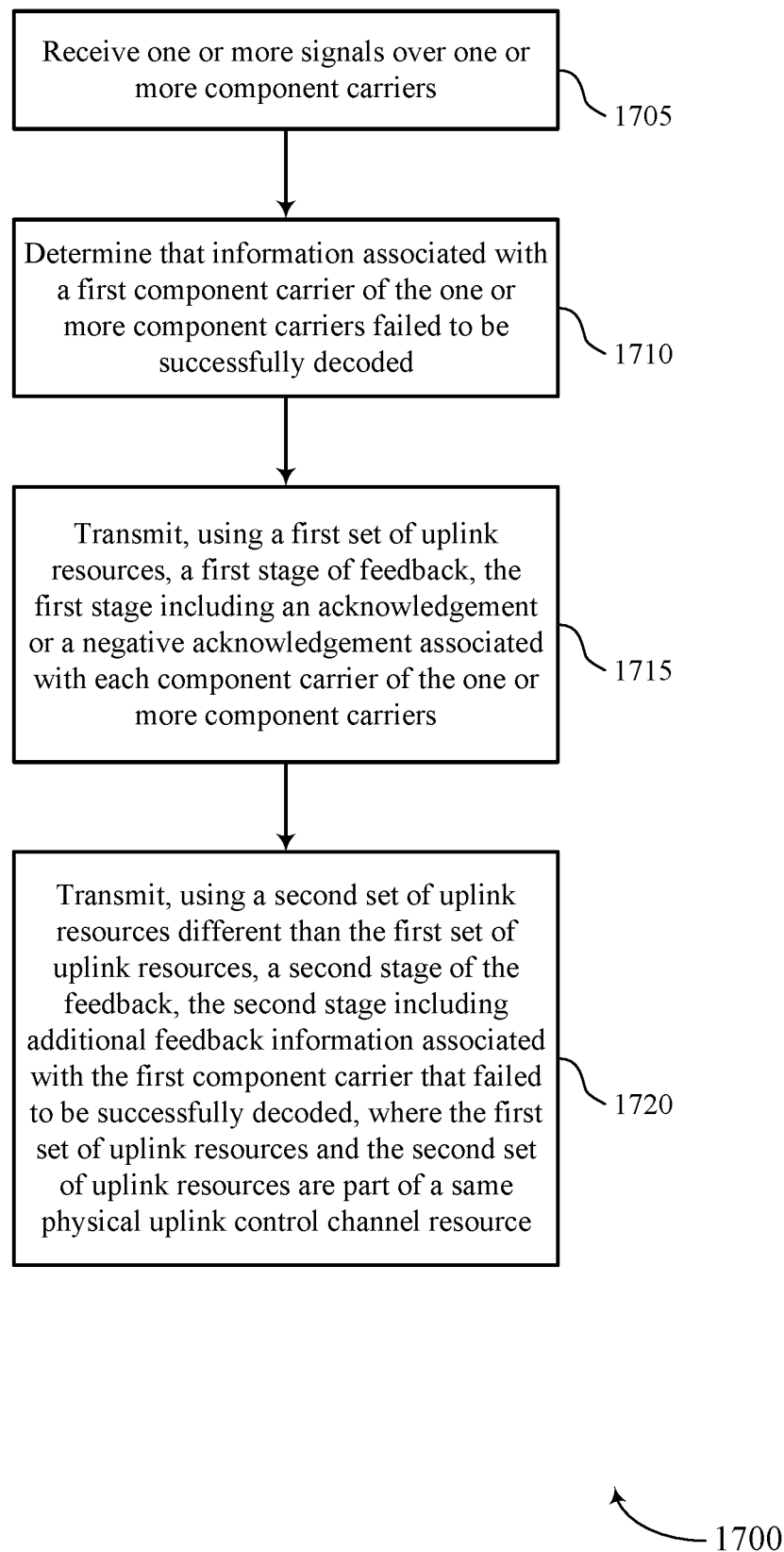

FIG. 17 shows a flowchart illustrating a method 1700 that supports two-stage feedback procedures in accordance with aspects of the present disclosure. The operations of method 1700 may be implemented by a UE 115 or its components as described herein. For example, the operations of method 1700 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1705, the UE may receive one or more signals over one or more component carriers. The operations of 1705 may be performed according to the methods described herein. In some examples, aspects of the operations of 1705 may be performed by a component carrier manager as described with reference to FIGS. 7 through 10.

At 1710, the UE may determine that information associated with a first component carrier of the one or more component carriers failed to be successfully decoded. The operations of 1710 may be performed according to the methods described herein. In some examples, aspects of the operations of 1710 may be performed by a feedback manager as described with reference to FIGS. 7 through 10.

At 1715, the UE may transmit, using a first set of uplink resources, a first stage of feedback, the first stage including an acknowledgement or a negative acknowledgement associated with each component carrier of the one or more component carriers. The operations of 1715 may be performed according to the methods described herein. In some examples, aspects of the operations of 1715 may be performed by a first stage manager as described with reference to FIGS. 7 through 10.

At 1720, the UE may transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof, where the first set of uplink resources and the second set of uplink resources are part of a same physical uplink control channel resource. The operations of 1720 may be performed according to the methods described herein. In some examples, aspects of the operations of 1720 may be performed by a second stage manager as described with reference to FIGS. 7 through 10.

Figure 18:
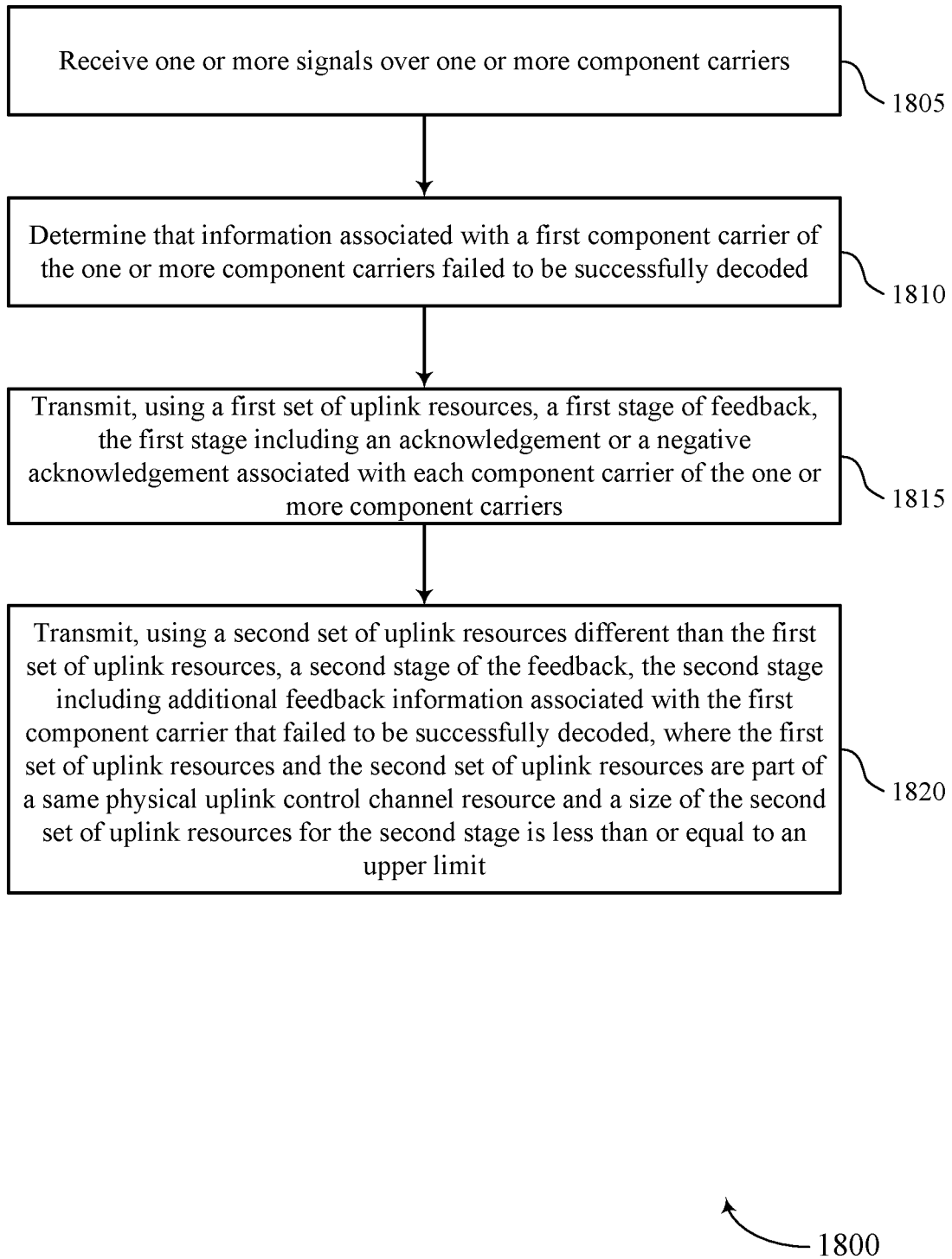

FIG. 18 shows a flowchart illustrating a method 1800 that supports two-stage feedback procedures in accordance with aspects of the present disclosure. The operations of method 1800 may be implemented by a UE 115 or its components as described herein. For example, the operations of method 1800 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1805, the UE may receive one or more signals over one or more component carriers. The operations of 1805 may be performed according to the methods described herein. In some examples, aspects of the operations of 1805 may be performed by a component carrier manager as described with reference to FIGS. 7 through 10.

At 1810, the UE may determine that information associated with a first component carrier of the one or more component carriers failed to be successfully decoded. The operations of 1810 may be performed according to the methods described herein. In some examples, aspects of the operations of 1810 may be performed by a feedback manager as described with reference to FIGS. 7 through 10.

At 1815, the UE may transmit, using a first set of uplink resources, a first stage of feedback, the first stage including an acknowledgement or a negative acknowledgement associated with each component carrier of the one or more component carriers. The operations of 1815 may be performed according to the methods described herein. In some examples, aspects of the operations of 1815 may be performed by a first stage manager as described with reference to FIGS. 7 through 10.

At 1820, the UE may transmit, using a second set of uplink resources different than the first set of uplink resources, a second stage of the feedback, the second stage including additional feedback information associated with the first component carrier that failed to be successfully decoded or with one or more other component carriers of the one or more component carriers, or a combination thereof, where the first set of uplink resources and the second set of uplink resources are part of a same physical uplink control channel resource and a size of the second set of uplink resources for the second stage is less than or equal to an upper limit. The operations of 1820 may be performed according to the methods described herein. In some examples, aspects of the operations of 1820 may be performed by a second stage manager as described with reference to FIGS. 7 through 10.

Figure 19:
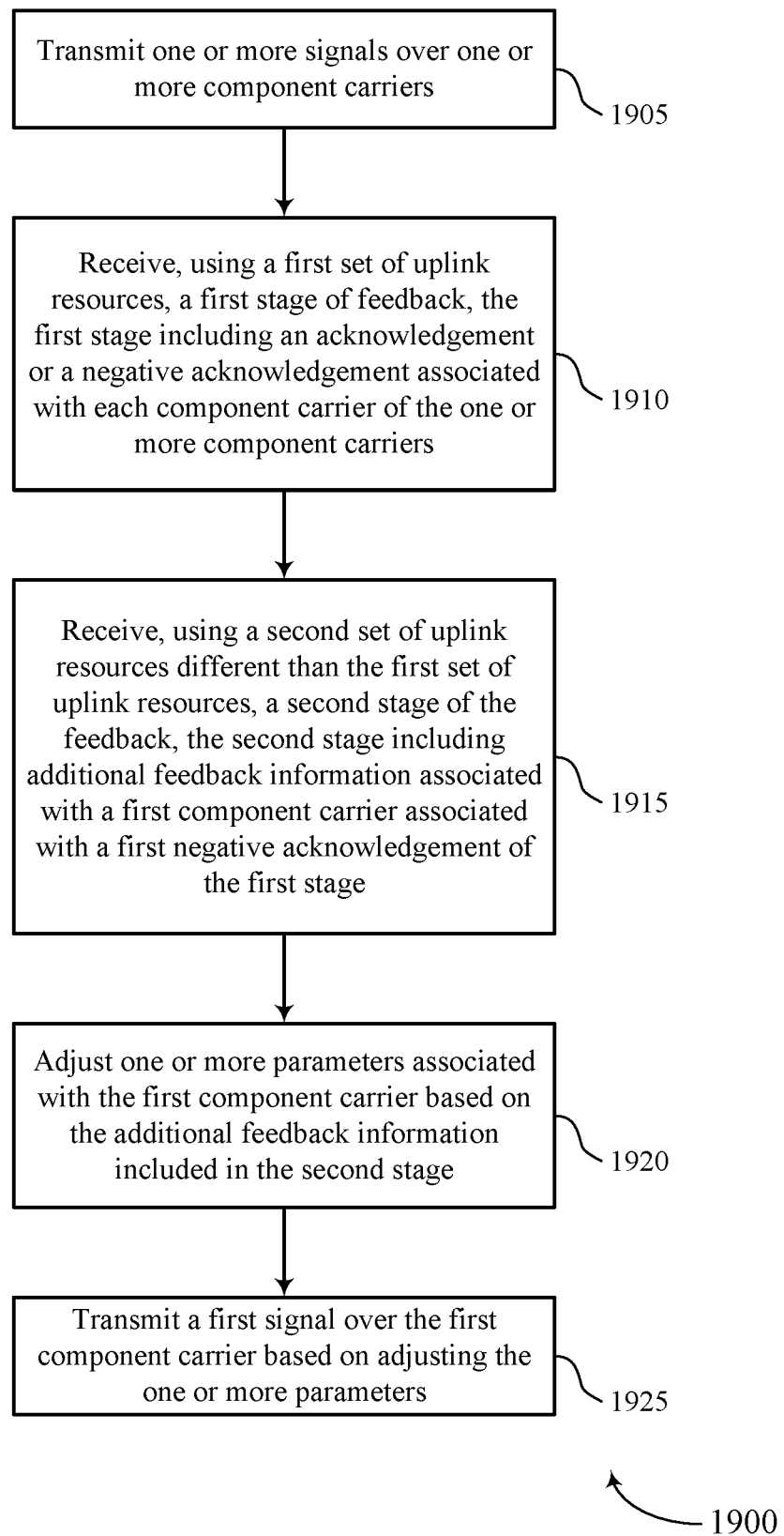

FIG. 19 shows a flowchart illustrating a method 1900 that supports two-stage feedback procedures in accordance with aspects of the present disclosure. The operations of method 1900 may be implemented by a base station 105 or its components as described herein. For example, the operations of method 1900 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 1905, the base station may transmit one or more signals over one or more component carriers. The operations of 1905 may be performed according to the methods described herein. In some examples, aspects of the operations of 1905 may be performed by a component carrier manager as described with reference to FIGS. 11 through 14.

At 1910, the base station may receive, using a first set of uplink resources, a first stage of feedback, the first stage including an acknowledgement or a negative acknowledgement associated with each component carrier of the one or more component carriers. The operations of 1910 may be performed according to the methods described herein. In some examples, aspects of the operations of 1910 may be performed by a first stage manager as described with reference to FIGS. 11 through 14.

At 1915, the base station may receive, using a second set of uplink resources different than the first set of uplink resources, a second stage of the feedback, the second stage including additional feedback information associated with a first component carrier associated with a first negative acknowledgement of the first stage. The operations of 1915 may be performed according to the methods described herein. In some examples, aspects of the operations of 1915 may be performed by a second stage manager as described with reference to FIGS. 11 through 14.

At 1920, the base station may adjust one or more parameters associated with the first component carrier based on the additional feedback information included in the second stage. The operations of 1920 may be performed according to the methods described herein. In some examples, aspects of the operations of 1920 may be performed by a feedback manager as described with reference to FIGS. 11 through 14.

At 1925, the base station may transmit a first signal over the first component carrier based on adjusting the one or more parameters. The operations of 1925 may be performed according to the methods described herein. In some examples, aspects of the operations of 1925 may be performed by a component carrier manager as described with reference to FIGS. 11 through 14.

Figure 20:
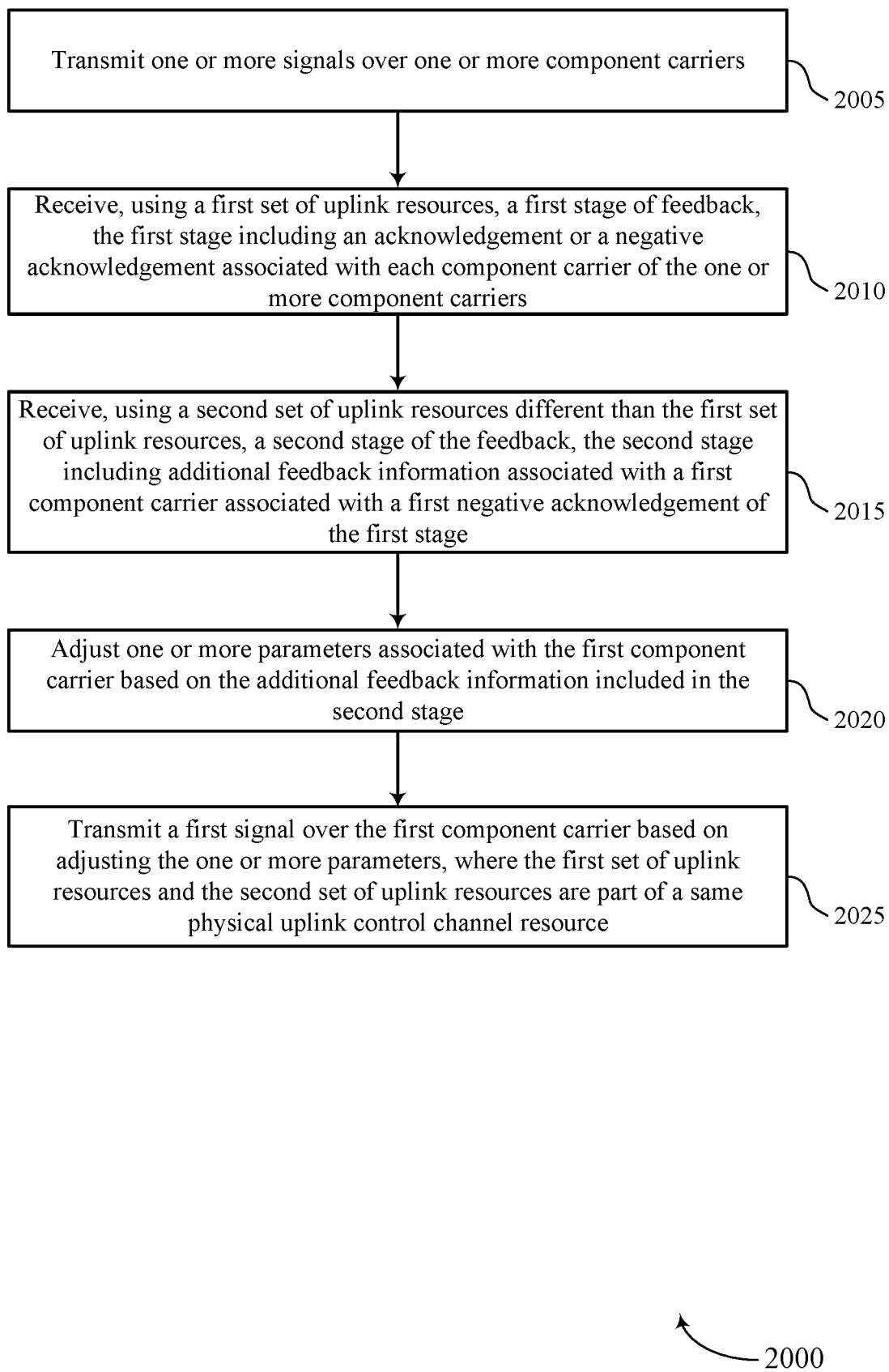

FIG. 20 shows a flowchart illustrating a method 2000 that supports two-stage feedback procedures in accordance with aspects of the present disclosure. The operations of method 2000 may be implemented by a base station 105 or its components as described herein. For example, the operations of method 2000 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 2005, the base station may transmit one or more signals over one or more component carriers. The operations of 2005 may be performed according to the methods described herein. In some examples, aspects of the operations of 2005 may be performed by a component carrier manager as described with reference to FIGS. 11 through 14.

At 2010, the base station may receive, using a first set of uplink resources, a first stage of feedback, the first stage including an acknowledgement or a negative acknowledgement associated with each component carrier of the one or more component carriers. The operations of 2010 may be performed according to the methods described herein. In some examples, aspects of the operations of 2010 may be performed by a first stage manager as described with reference to FIGS. 11 through 14.

At 2015, the base station may receive, using a second set of uplink resources different than the first set of uplink resources, a second stage of the feedback, the second stage including additional feedback information associated with a first component carrier associated with a first negative acknowledgement of the first stage. The operations of 2015 may be performed according to the methods described herein. In some examples, aspects of the operations of 2015 may be performed by a second stage manager as described with reference to FIGS. 11 through 14.

At 2020, the base station may adjust one or more parameters associated with the first component carrier based on the additional feedback information included in the second stage. The operations of 2020 may be performed according to the methods described herein. In some examples, aspects of the operations of 2020 may be performed by a feedback manager as described with reference to FIGS. 11 through 14.

At 2025, the base station may transmit a first signal over the first component carrier based on adjusting the one or more parameters, where the first set of uplink resources and the second set of uplink resources are part of a same physical uplink control channel resource. The operations of 2025 may be performed according to the methods described herein. In some examples, aspects of the operations of 2025 may be performed by a component carrier manager as described with reference to FIGS. 11 through 14.

Figure 21:
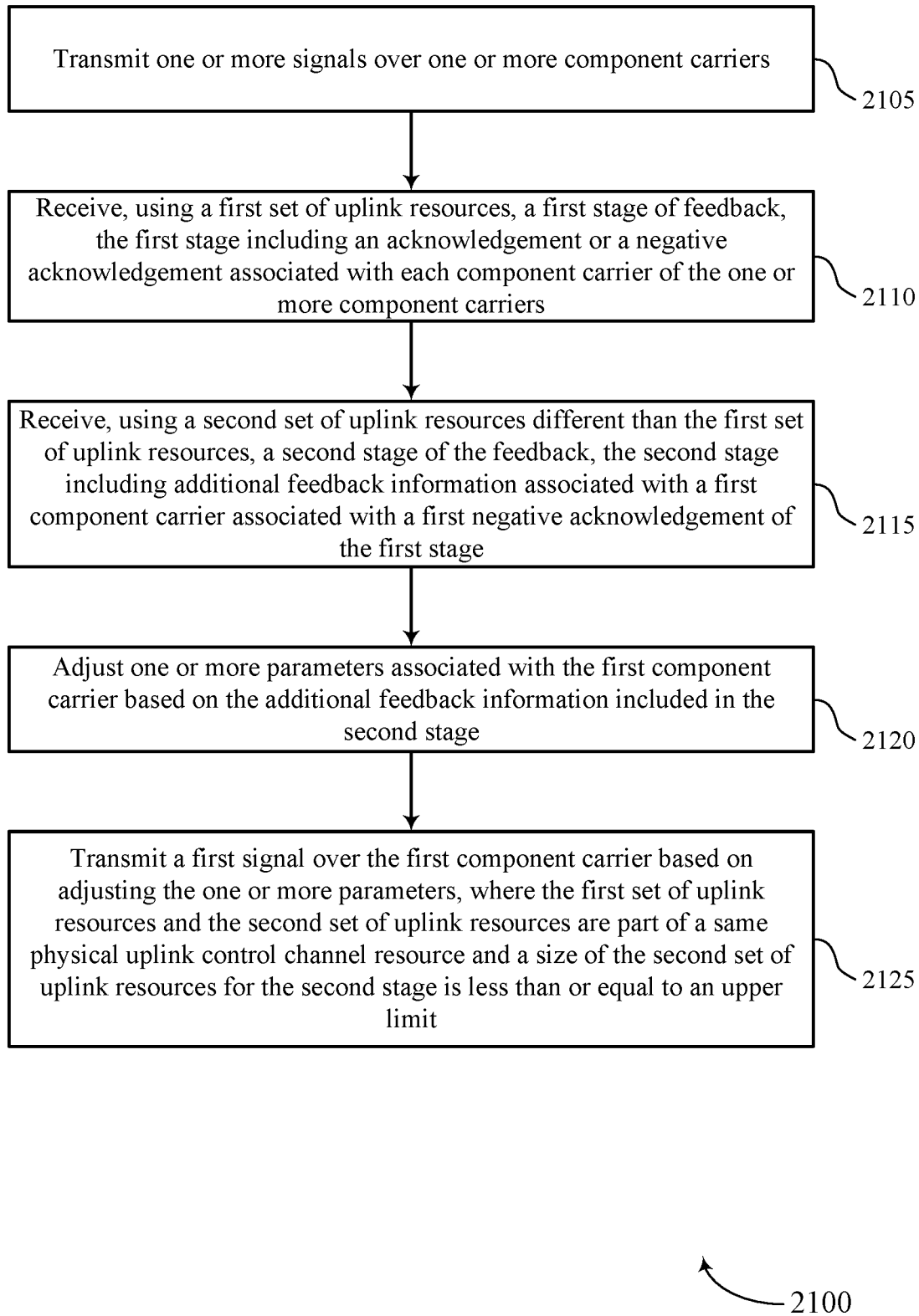

FIG. 21 shows a flowchart illustrating a method 2100 that supports two-stage feedback procedures in accordance with aspects of the present disclosure. The operations of method 2100 may be implemented by a base station 105 or its components as described herein. For example, the operations of method 2100 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 2105, the base station may transmit one or more signals over one or more component carriers. The operations of 2105 may be performed according to the methods described herein. In some examples, aspects of the operations of 2105 may be performed by a component carrier manager as described with reference to FIGS. 11 through 14.

At 2110, the base station may receive, using a first set of uplink resources, a first stage of feedback, the first stage including an acknowledgement or a negative acknowledgement associated with each component carrier of the one or more component carriers. The operations of 2110 may be performed according to the methods described herein. In some examples, aspects of the operations of 2110 may be performed by a first stage manager as described with reference to FIGS. 11 through 14.

At 2115, the base station may receive, using a second set of uplink resources different than the first set of uplink resources, a second stage of the feedback, the second stage including additional feedback information associated with a first component carrier associated with a first negative acknowledgement of the first stage. The operations of 2115 may be performed according to the methods described herein. In some examples, aspects of the operations of 2115 may be performed by a second stage manager as described with reference to FIGS. 11 through 14.

At 2120, the base station may adjust one or more parameters associated with the first component carrier based on the additional feedback information included in the second stage. The operations of 2120 may be performed according to the methods described herein. In some examples, aspects of the operations of 2120 may be performed by a feedback manager as described with reference to FIGS. 11 through 14.

At 2125, the base station may transmit a first signal over the first component carrier based on adjusting the one or more parameters, where the first set of uplink resources and the second set of uplink resources are part of a same physical uplink control channel resource and a size of the second set of uplink resources for the second stage is less than or equal to an upper limit. The operations of 2125 may be performed according to the methods described herein. In some examples, aspects of the operations of 2125 may be performed by a component carrier manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Aspect 1: A method for wireless communication at a UE, comprising: receiving one or more signals over one or more component carriers; determining that information associated with a first component carrier of the one or more component carriers failed to be successfully decoded; transmitting, using a first set of uplink resources, a first stage of feedback, the first stage comprising an acknowledgement or a negative acknowledgement associated with each component carrier of the one or more component carriers; and transmitting, using a second set of uplink resources different than the first set of uplink resources, a second stage of the feedback, the second stage comprising additional feedback information associated with the first component carrier that failed to be successfully decoded or with one or more other component carriers of the one or more component carriers, or a combination thereof.

Aspect 2: The method of aspect 1, wherein the first set of uplink resources are part of a first physical uplink control channel resource and the second set of uplink resources are part of a second physical uplink control channel resource different than the first physical uplink control channel resource.

Aspect 3: The method any of aspects 1 or 2, further comprising: identifying the first set of uplink resources for the first stage of the feedback based at least in part on second information included in a first field of downlink control information, wherein transmitting the first stage is based at least in part on identifying the first set of uplink resources; and identifying the second set of uplink resources for the second stage of the feedback based at least in part on third information included in a second field of the downlink control information different than the first field, wherein transmitting the second stage is based at least in part on identifying the second set of uplink resources.

Aspect 4: The method any of aspects 1 to 3, further comprising: identifying the first set of uplink resources for the first stage of the feedback, wherein transmitting the first stage is based at least in part on identifying the first set of uplink resources; and identifying the second set of uplink resources for the second stage of the feedback based at least in part on a resource offset relative to the first set of uplink resources, wherein transmitting the second stage is based at least in part on identifying the second set of uplink resources.

Aspect 5: The method of aspect 4, wherein the resource offset comprises a constant slot resource, a constant offset in both a time resource and a frequency resource, a dynamic offset in both the time resource and the frequency resource configured by a radio resource control message, or a dynamic offset in both the time resource and the frequency resource configured by downlink control information, or a combination thereof.

Aspect 6: The method any of aspects 1 to 5, further comprising: identifying a grant-free physical uplink channel resource, wherein the second set of uplink resources comprises the grant-free physical uplink control channel resource, wherein transmitting the second stage is based at least in part on identifying the grant-free physical uplink control channel resource.

Aspect 7: The method any of aspects 1 to 6, wherein the first set of uplink resources and the second set of uplink resources are part of a same physical uplink control channel resource.

Aspect 8: The method of aspect 7, wherein the first stage and the second stage are separately encoded.

Aspect 9: The method of aspect 8, wherein the first set of uplink resources associated with the first stage comprise a first resource block and the second set of uplink resources associated with the second stage comprise a second resource block different than the first resource block.

Aspect 10: The method of aspect 8, wherein the first set of uplink resources associated with the first stage comprise a first resource element and the second set of uplink resources associated with the second stage comprise a second resource element different than the first resource element.

Aspect 11: The method of aspect 7, wherein the first stage and the second stage are jointly encoded.

Aspect 12: The method of aspect 11, further comprising: determining that a size of information for the first stage and the second stage is less than an upper limit of a size of the first set of uplink resources and the second set of uplink resources allocated for transmitting the first stage and the second stage; and appending one or more bits to the information for the first stage and the second stage based at least in part on determining that the size is less than the upper limit, wherein transmitting the second stage is based at least in part on appending the one or more bits to the information for the first stage and the second stage.

Aspect 13: The method any of aspects 1 to 12, further comprising: determining that a size of information for the first stage and the second stage exceeds an upper limit of a size of the first set of uplink resources and the second set of uplink resources allocated for transmitting the first stage and the second stage; and compressing the additional feedback information of the second stage based at least in part on determining that the size exceeds the upper limit, wherein transmitting the second stage is based at least in part on compressing the additional feedback information.

Aspect 14: The method any of aspects 1 to 14, wherein the first set of uplink resources and the second set of uplink resources are part of a same physical uplink control channel resource and a size of the second set of uplink resources for the second stage is less than or equal to an upper limit.

Aspect 15: The method of aspect 14, further comprising: determining that a second size of the additional feedback information of the second stage exceeds the upper limit of the second set of uplink resources; and compressing the additional feedback information of the second stage based at least in part on determining that the second size exceeds the upper limit of the second set of uplink resources, wherein transmitting the second stage is based at least in part on compressing the additional feedback information.

Aspect 16: The method of aspect 14, wherein the first stage and the second stage are separately encoded.

Aspect 17: The method of aspect 16, wherein the first set of uplink resources associated with the first stage and the second set of uplink resources associated with the first stage are partitioned in the physical uplink control channel resource on a resource block basis, a resource element basis, or a symbol basis.

Aspect 18: The method of aspect 14, wherein the first stage and the second stage are jointly encoded.

Aspect 19: The method of aspect 18, further comprising: determining that a second size of the additional feedback information of the second stage is less than the upper limit of the second set of uplink resources; and appending one or more bits to the additional feedback information for the second stage based at least in part on determining that the second size is less than the upper limit, wherein transmitting the second stage is based at least in part on appending the one or more bits to the additional feedback information for the second stage.

Aspect 20: The method of aspect 14, further comprising: selecting the same physical uplink control channel resource for transmitting the first stage and the second stage based at least in part on a second upper limit for a total size of the first stage and the second stage, wherein transmitting the second stage is based at least in part on selecting the same physical uplink control channel resource.

Aspect 21: The method any of aspects 1 to 20, further comprising: determining that downlink control information for the first component carrier failed to be detected, wherein the additional feedback information includes an indication that the downlink control information for the first component carrier failed to be detected.

Aspect 22: the method of aspect 21, wherein the downlink control information is part of a physical downlink control channel of the first component carrier.

Aspect 23: The method any of aspects 1 to 22, further comprising: determining that a physical downlink shared channel of the first component carrier failed to be successfully decoded, wherein the additional feedback information includes an indication of channel information associated with the physical downlink shared channel of the first component carrier that failed to be successfully decoded.

Aspect 24: The method any of aspects 1 to 2, wherein the additional feedback information comprises: a first indicator that indicates whether downlink control information for the first component carrier failed to be detected; and a second indicator that indicates channel information about a physical downlink shared channel of the first component carrier.

Aspect 25: The method of aspect 24, wherein the channel information comprises channel state information, channel quality information, precoder information, beam refinement information, or a combination thereof.

Aspect 26: The method any of aspects 1 to 25, further comprising: receiving a downlink control message that indicates that the first component carrier of the one or more component carriers operates in a first mode for reporting the feedback and that a second component carrier of the one or more component carriers operates in a second mode for reporting the feedback different than the first mode, the first mode comprising transmitting the first stage of the feedback, and the second mode comprising transmitting the first stage of the feedback and the second stage of the feedback, wherein transmitting the second stage is based at least in part on the second component carrier operating in the second mode.

Aspect 27: The method of aspect 26, further comprising: identifying the feedback for the first component carrier operating in the first mode using a first codebook; identifying the feedback for the second component carrier operating in the second mode using a second codebook different than the first codebook; and concatenating the feedback for the first component carrier and the feedback for the second component carrier, wherein transmitting the first stage or transmitting the second stage is based at least in part on the concatenation.

Aspect 28: The method of aspect 26, wherein the feedback for the first component carrier operating in the first mode is built using a first downlink assignment index and the feedback for the second component carrier operating in the second mode is built using a second downlink assignment index different than the first downlink assignment index.

Aspect 29: The method of aspect 26, wherein the downlink control message is a radio resource control message.

Aspect 30: The method of aspect 26, wherein the downlink control message indicates that a third component carrier of the one or more component carriers operates in a third mode different than the first mode and the second mode, the third mode comprising transmitting the first stage of the feedback for a first downlink channel of the third component carrier transmitting the first stage of the feedback and the second stage of the feedback for a second downlink channel of the third component carrier.

Aspect 31: The method of aspect 30, wherein the first downlink channel uses a first downlink control information format and the second downlink channel uses a second downlink control information format different than the first downlink control information format.

Aspect 32: The method of aspect 30, wherein an indicator in the downlink control information for the first downlink channel indicates whether feedback for the first downlink channel includes the second stage.

Aspect 33: The method any of aspects 1 to 32, further comprising: identifying a first bit size of the first stage based at least in part on a first quantity of physical downlink shared channels scheduled on the one or more component carriers; and identifying a second bit size of the second stage based at least in part on a second quantity of negative acknowledgements included in the first stage, wherein transmitting the second stage is based at least in part on identifying the second bit size of the second stage.

Aspect 34: The method of aspect 33, further comprising: identifying a bit width for the additional feedback information associated with the first component carrier, wherein identifying the second bit size is based at least in part on identifying the bit width.

Aspect 35: The method any of aspects 1 to 34, wherein the first stage of feedback and the second stage of feedback comprise stages of hybrid automatic repeat request feedback.

Aspect 36: A method for wireless communication at a base station, comprising: transmitting one or more signals over one or more component carriers; receiving, using a first set of uplink resources, a first stage of feedback, the first stage comprising an acknowledgement or a negative acknowledgement associated with each component carrier of the one or more component carriers; receiving, using a second set of uplink resources different than the first set of uplink resources, a second stage of the feedback, the second stage comprising additional feedback information associated with a first component carrier associated with a first negative acknowledgement of the first stage; adjusting one or more parameters associated with the first component carrier based at least in part on the additional feedback information included in the second stage; and transmitting a first signal over the first component carrier based at least in part on adjusting the one or more parameters.

Aspect 37: The method of aspect 36, wherein the first set of uplink resources are part of a first physical uplink control channel resource and the second set of uplink resources are part of a second physical uplink control channel resource different than the first physical uplink control channel resource.

Aspect 38: The method any of aspects 36 or 37, further comprising: identifying the first set of uplink resources for the first stage of the feedback; identifying the second set of uplink resources for the second stage of the feedback; and transmitting downlink control information that comprises a first field indicating the first set of uplink resources and a second field indicating the second set of uplink resources, the second field different that than the first field, wherein receiving the first stage and the second stage is based at least in part on transmitting the downlink control information.

Aspect 39: The method any of aspects 36 to 38, further comprising: transmitting downlink control information indicating a resource offset between the first set of uplink resources and the second set of uplink resources, wherein receiving the first stage and the second stage is based at least in part on transmitting the downlink control information.

Aspect 40: The method of aspect 39, wherein the resource offset comprises a constant slot resource, a constant offset in both a time resource and a frequency resource, a dynamic offset in both the time resource and the frequency resource configured by a radio resource control message, or a dynamic offset in both the time resource and the frequency resource configured by downlink control information, or a combination thereof.

Aspect 41: The method any of aspects 36 to 40, wherein receiving the second set of uplink resources comprises: receiving a grant-free physical uplink channel resource that comprises the second set of uplink resources.

Aspect 42: The method any of aspects 36 to 41, wherein the first set of uplink resources and the second set of uplink resources are part of a same physical uplink control channel resource.

Aspect 43: The method of aspect 42, wherein the first stage and the second stage are separately encoded.

Aspect 44: The method of aspect 43, wherein the first set of uplink resources associated with the first stage comprise a first resource block and the second set of uplink resources associated with the second stage comprise a second resource block different than the first resource block.

Aspect 45: The method of aspect 43, wherein the first set of uplink resources associated with the first stage comprise a first resource element and the second set of uplink resources associated with the second stage comprise a second resource element different than the first resource element.

Aspect 46: The method of aspect 42, wherein the first stage and the second stage are jointly encoded.

Aspect 47: The method of aspect 46, further comprising: determining that a size of information for the first stage and the second stage is less than an upper limit of a size of the first set of uplink resources and the second set of uplink resources allocated for transmitting the first stage and the second stage, wherein receiving the second stage comprises receiving the additional feedback information that has been appended.

Aspect 48: The method any of aspects 36 to 47, further comprising: determining that a size of information for the first stage and the second stage exceeds an upper limit of a size of the first set of uplink resources and the second set of uplink resources allocated for transmitting the first stage and the second stage, wherein receiving the second stage comprises receiving the additional feedback information that has been compressed.

Aspect 49: The method any of aspects 36 to 48, wherein the first set of uplink resources and the second set of uplink resources are part of a same physical uplink control channel resource and a size of the second set of uplink resources for the second stage is less than or equal to an upper limit.

Aspect 50: The method of aspect 49, further comprising: determining that a second size of the additional feedback information of the second stage exceeds the upper limit of the second set of uplink resources, wherein receiving the second stage comprises receiving the additional feedback information that has been compressed.

Aspect 51: The method of aspect 49, wherein the first stage and the second stage are separately encoded.

Aspect 52: The method of aspect 51, wherein the first set of uplink resources associated with the first stage and the second set of uplink resources associated with the first stage are partitioned in the physical uplink control channel resource on a resource block basis, a resource element basis, or a symbol basis.

Aspect 53: The method of aspect 49, wherein the first stage and the second stage are jointly encoded.

Aspect 54: The method of aspect 53, further comprising: determining that a second size of the additional feedback information of the second stage is less than the upper limit of the second set of uplink resources, wherein receiving the second stage comprises receiving the additional feedback information that has been appended.

Aspect 55: The method of aspect 49, wherein the same physical uplink control channel resource is selected for transmitting the first stage and the second stage based at least in part on a second upper limit for a total size of the first stage and the second stage.

Aspect 56: The method of aspect 36, further comprising: identifying, in the additional feedback information of the second stage, an indication that downlink control information for the first component carrier failed to be detected, wherein adjusting the one or more parameters comprises adjusting one or more transmission parameters of a physical downlink control channel associated with the first component carrier based at least in part on identifying the indication.

Aspect 57: The method of aspect 56, wherein the downlink control information is part of a second physical downlink control channel of the first component carrier.

Aspect 58: The method any of aspects 36 to 57, further comprising: identifying, in the additional feedback information of the second stage, an indication of channel information associated with a first physical downlink shared channel of the first component carrier that failed to be successfully decoded, wherein adjusting the one or more parameters comprises adjusting one or more transmission parameters of a second physical downlink shared channel associated with the first component carrier based at least in part on identifying the indication.

Aspect 59: The method any of aspects 36 to 58, wherein the additional feedback information comprises: a first indicator that indicates whether downlink control information for the first component carrier failed to be detected; and a second indicator that indicates channel information about a physical downlink shared channel of the first component carrier.

Aspect 60: The method of aspect 59, wherein the channel information comprises channel state information, channel quality information, precoder information, beam refinement information, or a combination thereof.

Aspect 61: The method any of aspects 36 to 60, further comprising: transmitting a downlink control message that indicates that the first component carrier of the one or more component carriers operates in a first mode for reporting the feedback and that a second component carrier of the one or more component carriers operates in a second mode for reporting the feedback different than the first mode, the first mode comprising transmitting the first stage of the feedback and the second mode comprising transmitting the first stage of the feedback and the second stage of the feedback, wherein receiving the second stage is based at least in part on the second component carrier operating in the second mode.

Aspect 62: The method of aspect 61, wherein the feedback for the first component carrier operating in the first mode is built using a first downlink assignment index and the feedback for the second component carrier operating in the second mode is built using a second downlink assignment index different than the first downlink assignment index.

Aspect 63: The method of aspect 61, wherein the downlink control message is a radio resource control message.

Aspect 64: The method of aspect 61, wherein the downlink control message indicates that a third component carrier of the one or more component carriers operates in a third mode different than the first mode and the second mode, the third mode comprising transmitting the first stage of the feedback for a first downlink channel of the third component carrier transmitting the first stage of the feedback and the second stage of the feedback for a second downlink channel of the third component carrier.

Aspect 65: The method of aspect 64, wherein the first downlink channel uses a first downlink control information format and the second downlink channel uses a second downlink control information format different than the first downlink control information format.

Aspect 66: The method of aspect 64, wherein an indicator in the downlink control information for the first downlink channel indicates whether feedback for the first downlink channel includes the second stage.

Aspect 67: The method any of aspects 36 to 66, further comprising: identifying a first bit size of the first stage based at least in part on a first quantity of physical downlink shared channels scheduled on the one or more component carriers; and identifying a second bit size of the second stage based at least in part on a second quantity of negative acknowledgements included in the first stage, wherein receiving the second stage is based at least in part on identifying the second bit size of the second stage.

Aspect 68: The method of aspect 67, further comprising: identifying a bit width for the feedback information associated with the first component carrier, wherein identifying the second bit size is based at least in part on identifying the bit width.

Aspect 69: The method any of aspects 36 to 68, wherein the first stage of feedback and the second stage of feedback comprise stages of hybrid automatic repeat request feedback.

Aspect 70: An apparatus for wireless communication at a UE, comprising a processor; memory coupled with the processor; and instructions stored in the memory and executable by the processor to cause the apparatus to perform a method of any of aspects 1 through 35.

Aspect 71: An apparatus for wireless communication at a UE, comprising at least one means for performing a method of any of aspects 1 through 35.

Aspect 72: A non-transitory computer-readable medium storing code for wireless communication at a UE, the code comprising instructions executable by a processor to perform a method of any of aspects 1 through 35.

Aspect 73: An apparatus for wireless communication at a base station, comprising a processor; memory coupled with the processor; and instructions stored in the memory and executable by the processor to cause the apparatus to perform a method of any of aspects 36 through 69.

Aspect 74: An apparatus for wireless communication at a base station, comprising at least one means for performing a method of any of aspects 36 through 69.

Aspect 75: A non-transitory computer-readable medium storing code for wireless communication at a base station, the code comprising instructions executable by a processor to perform a method of any of aspects 36 through 69.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving one or more signals over one or more component carriers;
   determining that information associated with a first component carrier of the one or more component carriers failed to be successfully decoded;
   transmitting, using a first set of uplink resources, a first stage of feedback, the first stage comprising an acknowledgement or a negative acknowledgement associated with each component carrier of the one or more component carriers; and
   transmitting, using a second set of uplink resources different than the first set of uplink resources and based at least in part on the first component carrier having failed to be successfully decoded, a second stage of the feedback, the second stage comprising additional feedback information associated with the first component carrier that failed to be successfully decoded.

2. The method of claim 1, wherein the first set of uplink resources are part of a first physical uplink control channel resource and the second set of uplink resources are part of a second physical uplink control channel resource different than the first physical uplink control channel resource.

3. The method of claim 1, further comprising:
   identifying the first set of uplink resources for the first stage of the feedback based at least in part on second information included in a first field of downlink control information, wherein transmitting the first stage is based at least in part on identifying the first set of uplink resources; and
   identifying the second set of uplink resources for the second stage of the feedback based at least in part on third information included in a second field of the downlink control information different than the first field, wherein transmitting the second stage is based at least in part on identifying the second set of uplink resources.

4. The method of claim 1, further comprising:
identifying the first set of uplink resources for the first stage of the feedback, wherein transmitting the first stage is based at least in part on identifying the first set of uplink resources; and
identifying the second set of uplink resources for the second stage of the feedback based at least in part on a resource offset relative to the first set of uplink resources, wherein transmitting the second stage is based at least in part on identifying the second set of uplink resources, and wherein the resource offset comprises a constant slot resource, a constant offset in both a time resource and a frequency resource, a dynamic offset in both the time resource and the frequency resource configured by a radio resource control message, or a dynamic offset in both the time resource and the frequency resource configured by downlink control information, or a combination thereof.

5. The method of claim 1, wherein the first set of uplink resources and the second set of uplink resources are part of a same physical uplink control channel resource.

6. The method of claim 5, wherein the first stage and the second stage are separately encoded.

7. The method of claim 5, wherein the first stage and the second stage are jointly encoded.

8. The method of claim 7, further comprising:
determining that a size of information for the first stage and the second stage is less than an upper limit of a size of the first set of uplink resources and the second set of uplink resources allocated for transmitting the first stage and the second stage; and
appending one or more bits to the information for the first stage and the second stage based at least in part on determining that the size is less than the upper limit, wherein transmitting the second stage is based at least in part on appending the one or more bits to the information for the first stage and the second stage.

9. The method of claim 1, further comprising:
determining that a size of information for the first stage and the second stage exceeds an upper limit of a size of the first set of uplink resources and the second set of uplink resources allocated for transmitting the first stage and the second stage; and
compressing the additional feedback information of the second stage based at least in part on determining that the size exceeds the upper limit, wherein transmitting the second stage is based at least in part on compressing the additional feedback information.

10. The method of claim 1, wherein the first set of uplink resources and the second set of uplink resources are part of a same physical uplink control channel resource and a size of the second set of uplink resources for the second stage is less than or equal to an upper limit.

11. The method of claim 10, further comprising:
determining that a second size of the additional feedback information of the second stage exceeds the upper limit of the second set of uplink resources; and
compressing the additional feedback information of the second stage based at least in part on determining that the second size exceeds the upper limit of the second set of uplink resources, wherein transmitting the second stage is based at least in part on compressing the additional feedback information.

12. The method of claim 10, wherein the first stage and the second stage are separately encoded, and wherein the first set of uplink resources associated with the first stage and the second set of uplink resources associated with the second stage are partitioned in the physical uplink control channel resource on a resource block basis, a resource element basis, or a symbol basis.

13. The method of claim 10, wherein the first stage and the second stage are jointly encoded, the method further comprising:
determining that a second size of the additional feedback information of the second stage is less than the upper limit of the second set of uplink resources; and
appending one or more bits to the additional feedback information for the second stage based at least in part on determining that the second size is less than the upper limit, wherein transmitting the second stage is based at least in part on appending the one or more bits to the additional feedback information for the second stage.

14. The method of claim 10, further comprising:
selecting the same physical uplink control channel resource for transmitting the first stage and the second stage based at least in part on a second upper limit for a total size of the first stage and the second stage, wherein transmitting the second stage is based at least in part on selecting the same physical uplink control channel resource.

15. The method of claim 1, further comprising:
determining that downlink control information for the first component carrier failed to be detected, wherein the additional feedback information includes an indication that the downlink control information for the first component carrier failed to be detected.

16. The method of claim 1, further comprising:
determining that a physical downlink shared channel of the first component carrier failed to be successfully decoded, wherein the additional feedback information includes an indication of channel information associated with the physical downlink shared channel of the first component carrier that failed to be successfully decoded.

17. The method of claim 1, wherein the additional feedback information comprises:
a first indicator that indicates whether downlink control information for the first component carrier failed to be detected; and
a second indicator that indicates channel information about a physical downlink shared channel of the first component carrier.

18. The method of claim 17, wherein the channel information comprises channel state information, channel quality information, precoder information, beam refinement information, or a combination thereof.

19. The method of claim 1, further comprising:
receiving a downlink control message that indicates that the first component carrier of the one or more component carriers operates in a first mode for reporting the feedback and that a second component carrier of the one or more component carriers operates in a second mode for reporting the feedback different than the first mode, the first mode comprising transmitting the first stage of the feedback, and the second mode comprising transmitting the first stage of the feedback and the second stage of the feedback, wherein transmitting the second stage is based at least in part on the second component carrier operating in the second mode.

20. The method of claim 19, wherein the feedback for the first component carrier operating in the first mode is built using a first downlink assignment index and the feedback for the second component carrier operating in the second mode is built using a second downlink assignment index different than the first downlink assignment index.

21. The method of claim 1, further comprising:
identifying a first bit size of the first stage based at least in part on a first quantity of physical downlink shared channels scheduled on the one or more component carriers; and
identifying a second bit size of the second stage based at least in part on a second quantity of negative acknowledgements included in the first stage, wherein transmitting the second stage is based at least in part on identifying the second bit size of the second stage.

22. The method of claim 21, further comprising:
identifying a bit width for the additional feedback information associated with the first component carrier, wherein identifying the second bit size is based at least in part on identifying the bit width.

23. A method for wireless communication at a base station, comprising:
transmitting one or more signals over one or more component carriers;
receiving, using a first set of uplink resources, a first stage of feedback, the first stage comprising an acknowledgement or a negative acknowledgement associated with each component carrier of the one or more component carriers;
receiving, using a second set of uplink resources different than the first set of uplink resources, a second stage of the feedback, the second stage comprising additional feedback information associated with a first component carrier associated with a first negative acknowledgement of the first stage based at least in part on the first component carrier having failed to be successfully decoded;
adjusting one or more parameters associated with the first component carrier based at least in part on the additional feedback information included in the second stage; and
transmitting a first signal over the first component carrier based at least in part on adjusting the one or more parameters.

24. The method of claim 23, further comprising:
identifying the first set of uplink resources for the first stage of the feedback;
identifying the second set of uplink resources for the second stage of the feedback; and
transmitting downlink control information that comprises a first field indicating the first set of uplink resources and a second field indicating the second set of uplink resources, the second field different that than the first field, wherein receiving the first stage and the second stage is based at least in part on transmitting the downlink control information.

25. The method of claim 23, wherein the first set of uplink resources and the second set of uplink resources are part of a same physical uplink control channel resource.

26. The method of claim 23, wherein the first stage and the second stage are separately encoded.

27. The method of claim 23, wherein the first stage and the second stage are jointly encoded, the method further comprising:
determining that a size of information for the first stage and the second stage is less than an upper limit of a size of the first set of uplink resources and the second set of uplink resources allocated for transmitting the first stage and the second stage, wherein receiving the second stage comprises receiving the additional feedback information that has been appended.

28. The method of claim 23, further comprising:
determining that a size of information for the first stage and the second stage exceeds an upper limit of a size of the first set of uplink resources and the second set of uplink resources allocated for transmitting the first stage and the second stage, wherein receiving the second stage comprises receiving the additional feedback information that has been compressed.

29. An apparatus for wireless communication at a user equipment (UE), comprising:
a processor,
memory coupled with the processor, and
instructions stored in the memory and executable by the processor to cause the apparatus to:
receive one or more signals over one or more component carriers;
determine that information associated with a first component carrier of the one or more component carriers failed to be successfully decoded;
transmit, using a first set of uplink resources, a first stage of feedback, the first stage comprising an acknowledgement or a negative acknowledgement associated with each component carrier of the one or more component carriers; and
transmit, using a second set of uplink resources different than the first set of uplink resources and based at least in part on the first component carrier having failed to be successfully decoded, a second stage of the feedback, the second stage comprising additional feedback information associated with the first component carrier that failed to be successfully decoded.

30. An apparatus for wireless communication at a base station, comprising:
a processor,
memory coupled with the processor, and
instructions stored in the memory and executable by the processor to cause the apparatus to:
transmit one or more signals over one or more component carriers;
receive, using a first set of uplink resources, a first stage of feedback, the first stage comprising an acknowledgement or a negative acknowledgement associated with each component carrier of the one or more component carriers;
receive, using a second set of uplink resources different than the first set of uplink resources, a second stage of the feedback, the second stage comprising additional feedback information associated with a first component carrier associated with a first negative acknowledgement of the first stage based at least in part on the first component carrier having failed to be successfully decoded;
adjust one or more parameters associated with the first component carrier based at least in part on the additional feedback information included in the second stage; and
transmit a first signal over the first component carrier based at least in part on adjusting the one or more parameters.

31. The method of claim 1, wherein the second stage of the feedback excludes additional feedback information associated with one or more second component carriers that were successfully decoded based at least in part on the one or more second component carriers having been successfully decoded.

\* \* \* \* \*